(12) United States Patent
Wang et al.

(10) Patent No.: US 11,064,500 B2
(45) Date of Patent: Jul. 13, 2021

(54) METHODS AND APPARATUSES FOR DETERMINATION OF HELPER UE GROUP BASED IN PART ON SIDELINK CHANNEL DIVERSITY

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Chester, NJ (US); Xiaoxia Zhang, San Diego, CA (US); Jing Sun, San Diego, CA (US); Yisheng Xue, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/688,140

(22) Filed: Nov. 19, 2019

(65) Prior Publication Data

US 2021/0153213 A1     May 20, 2021

(51) Int. Cl.
*H04W 72/08*     (2009.01)
*H04W 24/08*     (2009.01)

(52) U.S. Cl.
CPC ........... *H04W 72/08* (2013.01); *H04W 24/08* (2013.01)

(58) Field of Classification Search
CPC ......... H04W 92/18; H04W 4/40; H04W 4/46; H04W 84/18; H04W 72/08; H04W 24/08; H04L 5/0048; H04L 1/1819
See application file for complete search history.

(56) References Cited

U.S. PATENT DOCUMENTS

| | | | |
|---|---|---|---|
| 2019/0239112 A1* | 8/2019 | Rao | H04W 4/70 |
| 2020/0022089 A1* | 1/2020 | Guo | H04W 92/18 |

* cited by examiner

*Primary Examiner* — Said M Elnoubi
(74) *Attorney, Agent, or Firm* — Qualcomm Incorporated

(57) ABSTRACT

Methods, systems, and devices for wireless communication are described. Generally, the described techniques provide for determining a helper UE group to facilitate communications with a target using sidelinks. A helper UE may determine a sidelink channel correlation with at least one other UE, report to a base station channel diversity information, UE state information, UE traffic pattern information, sidelink channel measurements, and the determined sidelink channel correlation; and receive an indication from the gNB if the UE is a member of a helper UE group. A base station may transmit a control message to at least one UE; receive a report comprising sidelink channel correlation information, sidelink channel diversity information, and UE state information, from each of the at least one UE, in response to transmitting the control message; and determine a helper UE group based on the received report.

30 Claims, 16 Drawing Sheets

METHODS AND APPARATUSES FOR DETERMINATION OF HELPER UE GROUP BASED IN PART ON SIDELINK CHANNEL DIVERSITY

FIELD OF TECHNOLOGY

The following relates generally to wireless communications and more specifically to determination of a helper user equipment (UE) group based in part on sidelink channel diversity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, such as industrial internet of things (I-IoT) applications, various UEs may be configured to communicate with each other over sidelink channels. These sidelink communications may enhance the wireless systems via reduced latency, multi-path diversity, coverage extension, battery-life improvement, location enhancement, and infrastructure-less communication. In some cases, each of the UEs may determine and report various types of information, including its sidelink channel diversity information, various state information, and traffic pattern information, among others. This is to help a base station determine a helper UE group to achieve the above mentioned effects or advantages of the sidelinks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some situations, a direct communication link between a target UE and a base station may not be optimal or usable for various reasons. A helper UE group may be formed to help forward the data from the base station to the target UE. From the perspective of a helper UE, the helper UE may determine a sidelink channel correlation with the target UE, and determine and provide various types of information to the base station.

In an aspect of the disclosure, a method, a computer-readable medium, and an apparatus are provided. The apparatus is configured to determine a sidelink channel correlation with at least one other UE; report to a generic nodeB (gNB) channel diversity information, UE state information, UE traffic pattern information, sidelink channel measurements, and the determined sidelink channel correlation; and receive an indication from the gNB if the UE is a member of a helper UE group.

In another aspect of the disclosure, a method, a computer-readable medium, and an apparatus are provided. The apparatus is configured to receive sidelink channel correlations from each of potential helper UEs, and further receive channel diversity information, UE state information, UE traffic pattern information, and sidelink channel measurements. The apparatus is further configured to determine a helper UE group based on the received sidelink channel correlations, the received channel diversity information, the received UE state information, the received UE traffic pattern information, and the received sidelink measurements. Then the apparatus may send a signaling message to each of the helper UE group to indicate whether the UE is a member of the helper UE group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
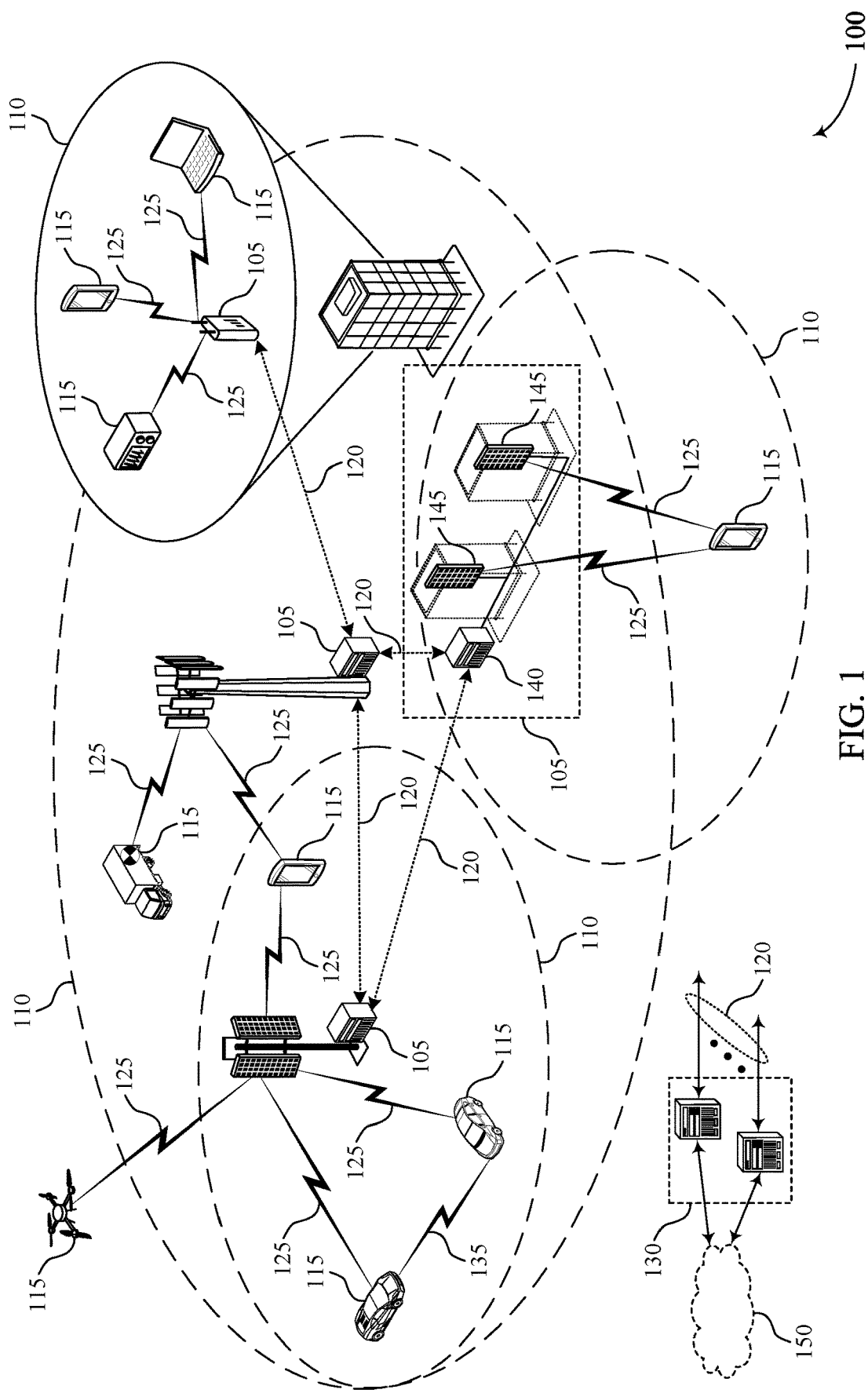
FIG. 1 illustrates an example of a system for wireless communications in accordance with aspects of the present disclosure.

In some wireless communications systems, such as industrial internet of things (I-Iot) applications and vehicle to everything (V2X) systems, various user equipments (UEs) may be configured to communicate with each other over sidelink channels. These sidelink communications may enhance the wireless systems via reduced latency, multi-path diversity, coverage extension, battery-life improvement, location enhancement, and infrastructure-less communication. A communication link may be established between a UE and a base station, but the link quality may be degraded due to fading or blockage. Another UE may be utilized to help the affected UE by communicating with the affected UE using a sidelink channel. In some cases, the UEs may perform various measurements to determine sidelink channel correlation and diversity and other information such as UE state information to help the BS determine a helper UE group to help with the communications with the affected UE, which is also termed target UE in this disclosure.

In some cases, a UE may determine a sidelink channel correlation with at least one other UE and report to a generic nodeB (gNB) channel diversity information, UE state information, UE traffic pattern information, sidelink channel measurements, and the determined sidelink channel correlation; and receive an indication from the gNB if the UE is a member of a helping/helper UE group. When a link between a base station fails or degrades due to fading, blocking, etc., then the base station may leverage the helper UE groups to communicate data to and receive data from an affected UE (e.g., targeted UE) through the helping UE or helper UE by leveraging a sidelink channel between the affected UE and the helper UE.

In some aspects, the base station may receive sidelink channel correlation information from each of a set of potential helper UEs and further receive UE channel diversity information, UE state information, UE traffic pattern information, and sidelink channel measurements. The base station may determine a helping/helper UE group based on the received sidelink channel correlation information, the received channel diversity information, the received UE state information, the received UE traffic pattern information, and the received sidelink measurements.

Techniques are provided herein to determine sidelink channel diversity based on various information received from each of the at least one UE. A base station may communicate an indication to each of the at least one UE whether the UE is a member of the determined helper UE group and transmit data to one or more member of the helper UE group to be forward/retransmitted to the target UE.

Particular aspects of the subject matter described herein may be implemented to realize one or more advantages. The described techniques may support improvements in the sidelink communication framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to wireless communications systems and a process flow diagram. Aspects of the disclosure are further illustrated by and described with reference to apparatus diagrams, system diagrams, and flowcharts that relate to determining a helper UE group.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

UEs 115 may be configured to communicate with each other over sidelink channels. These sidelink communications may enhance the wireless systems via reduced latency, multi-path diversity, coverage extension, battery-life improvement, location enhancement, and infrastructure-less communication. For example, a communication link may be established between a UE 115 and a base station 105. However, the link quality may be degraded due to fading or blockage. Another UE 115 may be utilized to help the affected UE 115 by communicating with the affected UE 115 using a sidelink channel. In some cases, the UEs 115 may perform various measurements to determine sidelink channel quality, channel throughput, and other metrics to determine whether to utilize a sidelink channel.

Another UE may be utilized to help the affected UE by communicating with the affected UE using a sidelink channel. In some cases, the UEs may perform various measurements to determine sidelink channel correlation and diversity and other information such as UE state information to help the associated base station 105 determine a helper UE group.

In some cases, the UE 115 may determine a sidelink channel correlation with at least one other UE 115 and report to the generic nodeB (gNB) 105 channel diversity information, UE state information, UE traffic pattern information, sidelink channel measurements, and the determined sidelink channel correlation; and receive an indication from the gNB 105 if the UE 115 is a member of a helping/helper UE group to facilitate communications with the affected UE. When a link between a base station fails or degrades due to fading, blocking, etc., then the base station may leverage the helper UE groups to communicate data to and receive data from an affected UE (e.g., target UE) using another UE (e.g., helping UE or helper UE) by leveraging a sidelink channel between the affected UE and the helper UE.

In some aspects, the base station 105 may receive sidelink channel correlation information from at least one UE; receive from each of the potential helper UEs 115 channel diversity information, UE state information, UE traffic pattern information, and sidelink channel measurements. The base station 105 may determine a helping/helper UE group based on the received sidelink channel correlation information, the received channel diversity information, the received UE state information, the received UE traffic pattern information, and the received sidelink measurements.

Techniques are provided herein to determine sidelink channel diversity based on various information received from each of the at least one UE 115. A base station may communicate an indication to each of the at least one UE whether the UE 115 is a member of the determined helper UE group and transmit data to one or more members of the helper UE group to be forward/retransmitted to the target UE.

Figure 2A:
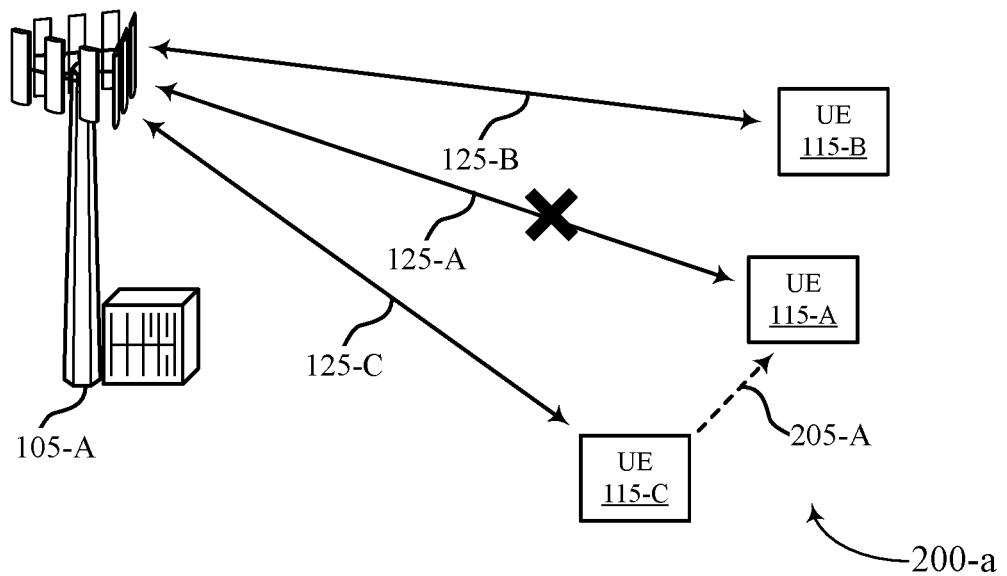
FIGS. 2A and 2B illustrate examples of wireless communications systems in accordance with aspects of the present disclosure.
Figure 2B:
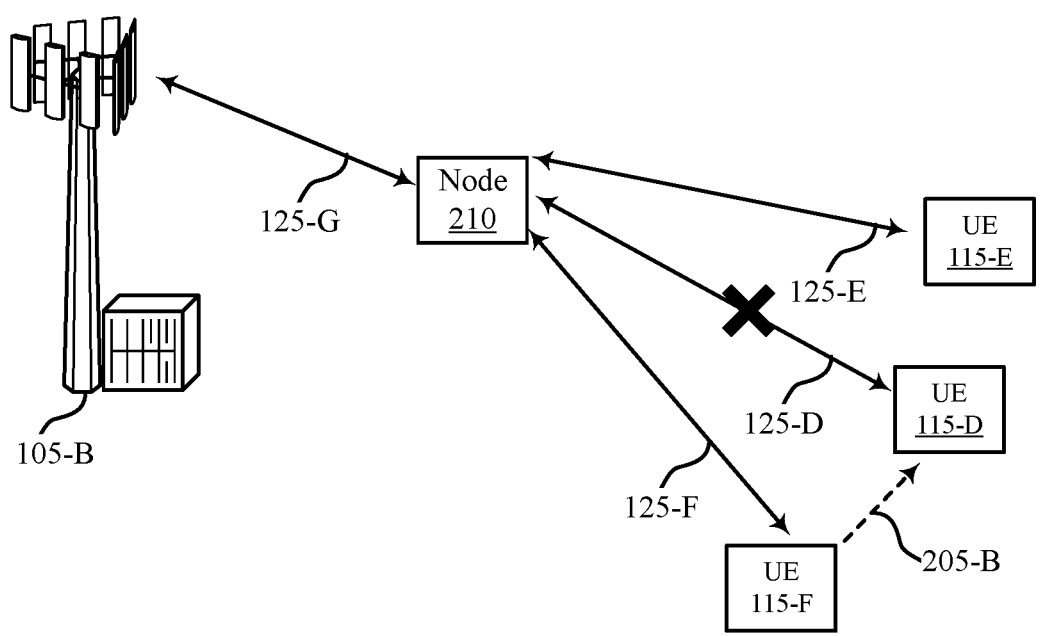

FIGS. 2A and 2B illustrates illustrate examples of wireless communications systems 200 in accordance with aspects of the present disclosure. In some examples, wireless communications systems 200 may implement aspects of wireless communications system 100. The wires communications systems 200 include base stations 105-*a* and 105-*b* and UEs 115, which may be examples of the corresponding devices of FIG. 1.

As illustrated in FIG. 2A, each of UE 115-*a*, UE 115-*b*, and UE 115-*c* may establish a respective communication link with base station 105-*a*. However, due to an issue such as fading or blocking, the communication link 125-*a* between UE 115-*a* and base station 105-*a* is degraded or is dropped. Thus, the base station 105-*a* may leverage sidelink channels (e.g., sidelink channel 205-*a*) to communicate with the UE 115-*a*. In some cases, to determine the quality of sidelink channels, the base station 105-*b* may inform nearby UE 115-*b* and UE 115-*c* to transmit sidelink diversity information, UE state information and UE traffic pattern information of the UE 115-*b* and UE 115-*c*. The base station 105-*a* may determine that UE 115-*b* and UE 115-*c* form a helper UE group to help communications with the affected UE 115-*a*. In FIG. 2A, the UE 115-*c* is helping or assisting the UE 115-*a* by forwarding or retransmitting data received from the base station 105-*a* to the UE 115-*a* through the sidelink 205-*a*.

To accomplish the goal of helping the UE 115-*a*, the helper UEs 115 (e.g., UE 115-*b* and UE 115-*c*) may measure the sidelinks the target UE 115-*a*. The UEs 115-*b* and 115-*c* may send various reports to the base station 105-*a* for determination of a helper group and a sidelink within the helper UE group. Since the base station 105-*a* configures the reporting of the UE 115-*a*, the base station 105-*a* may utilize various reports received from the helper UEs 115-*b* and 115-*c* to select the sidelink channel 205-*a* between the target UE 115-*a* and the help UE 115-*c* for communication with the UE 115-*a*. In some cases, the base station 105-*a* may transmit a control message to each of the UEs 115-*b* and 115-*c*, and the control message may request various reports on demand. The UEs 115-*b* and 115-*c* may report various sidelink measurements and diversity information, and UE state information, among others, to the base station 105-*a*. The base station 105-*a* may then transmit data and a relay instruction to one of the UEs 115-*b* and 105-*c* such that the UE 115-*b* or 115-*c* may retransmit the data to the UE 115-*a* using a sidelink channel. For example, the base station 105-*a* transmits the data to UE 115-*c* using link 125-*c*, and the UE 115-*c* relays/forwards/retransmits the data to UE 115-*a* using sidelink 205-*a*.

FIG. 2B includes base station 105-*b*, UE 115-*d*, UE 115-*e*, and UE 115-*f* as well as node 210. The node 210 may be an example of a base station 105 or UE 115, a mobile UE 115, a power line communication UE 115, a high powered UE 115, a virtual base station, etc. In one example, the node 210 may be an example of a programmable logic controller (PLC) node that may have variety of physical configurations in various deployment scenario. For example, the PLC may be a separate physical device deployed together with or separately from the base station 105-*b*. The node 210 communicates with base station 105-*b* over communication link 125-*g*. Further, the node 210 communicates with the UEs 115 over respective communication links 125. However, due to an issue such as fading or blocking, the communication link 125-*d* between UE 115-*d* and the node 210 is degraded or is dropped. Thus, the node 210 may leverage sidelink channels (e.g., sidelink channel 205) to communicate with the UE 115-*a*. In some cases, to determine the quality of sidelink channels, the node 210 may inform nearby UE 115-*e* and UE 115-*f* to transmit sidelink diversity information, UE state information and UE traffic pattern information of the UE 115-*e* and UE 115-*f*. The node 210 may determine that UE 115-*e* and UE 115-*f* form a helper UE group to help communications with the UE 115-*d*. In FIG. 2B, the UE 115-*f* is helping or assisting the UE 115-*d* by forwarding or retransmitting data received from the node 210 to the UE 115-*d* through the sidelink 205-*b*.

To accomplish the goal of helping the UE 115-*d*, the helper UEs 115 (e.g., UE 115-*e* and UE 115-*f*) may measure the sidelinks to the affected or target UE 115-*d*. The UEs 115-*e* and 115-*f* may send various reports to the node 210 for determination of a helper UE group and a sidelink within the helper UE group. Since the base station 105-*b* or the node 210 configures the reporting of the UE 115-*d*, the node 210 may utilize various reports received from the helper UEs 115-*e* and 115-*f* to select the sidelink channel 205-*b* between the target UE 115-*d* and the help UE 115-*f* for communication with the UE 115-*d*. In some cases, the node 210 may transmit a control message to each of the UEs 115-*e* and 115-*f*, and the control message may request various reports on demand. The UEs 115-*e* and 115-*f* may report various sidelink measurements and sidelink channel diversity information, and UE state information, among others, to the node 210. The node 210 may then transmit data and a relay instruction to one of the UEs 115-*e* and 105-*f* such that the UE 115-*e* or 115-*f* may retransmit the data to the UE 115-*d* using a sidelink channel. For example, the node 210 transmits the data to UE 115-*d* using link 125-*f*, and the UE 115-*f* relays/forwards/retransmits the data to UE 115-*d* using the sidelink 205-*b*.

Figure 3:
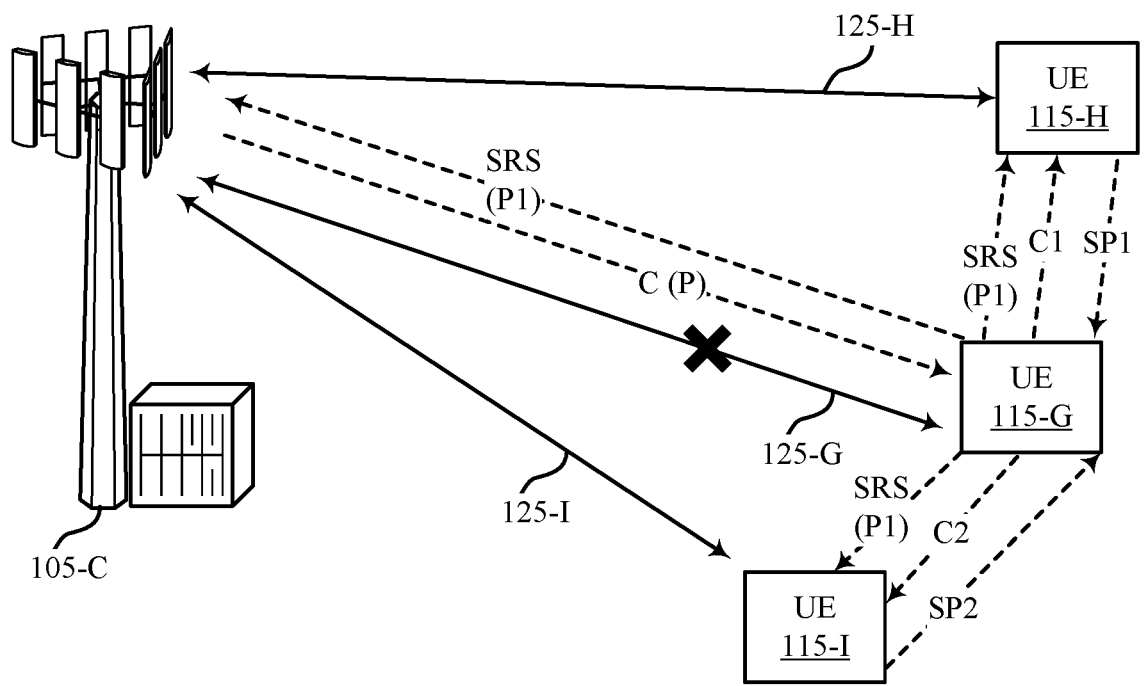
FIG. 3 illustrates an example of a wireless communications system in accordance with aspects of the present disclosure.

FIG. 3 illustrates an example of a wireless communications system 300 in accordance with aspects of the present disclosure. In some examples, wireless communications system 300 may implement aspects of wireless communications system 100. The wires communications systems 300 include base stations 105-*c* and UEs 115, which may be examples of the corresponding devices of FIGS. 1 and 2. The base station 105-*c* may establish respective communication links 125 with the UEs 115.

Due to an issue such as blocking or fading, the communication link 125-*g* between the base station 105-*c* and the UE 115-*g* may be degraded, fail, or be dropped. Accordingly, the base station 105-*c* may utilize techniques described herein to identify a sidelink for communication with the UE 115-*g*. The base station 105-*c* may transmit a control message to the UEs 115-*h* and 115-*i*, and the control message may indicate a scheduled or on-demand reporting of various information for the base station 105-*c* to determine a helper UE group. The UEs 115-*h* and 115-*i* may generate reports and transmit reports based on the control message.

In some example aspect, a UE 115 may determine sidelink diversity information with another UE 115 by measuring the signal transmission power on the sidelink associated with the other UE 115. For example, the UE 115-*g* may transmit a sounding reference signal (SRS) using a power P1, and the UE 115-*h* and UE 115-*i* may receive the SRS. The base station 105-*c* and the UEs 115-*h* and 115-*i* may measure the received SRS power of the transmitted SRS. For example, UE 115-*i* may receive the SRS from UE 115-*g* at power P1*C2, where C2 is the channel from the UE 115-*g* to the UE 115-*i*. UE 115-*i* is configured with a sidelink channel power of SP2. Thus, UE 115-*i* may calculate P1*C2*SP2, where C2*SP2 is the received power of sidelink data sent from UE 115-*i* to UE 115-*g*. Similarly, the UE 115-*h* may receive the SRS from UE 115-*g* at power P1*C1, where C1 is the channel from the UE 115-*g* to the UE 115-*h*. UE 115-*h* is configured with a sidelink channel power of SP1. Thus, UE 115-*h* may calculate P1*C1*SP1, where C1*SP1 is the received power of sidelink data sent from UE 115-*h* to UE 115-*g*.

In some example aspect, a base station 105 may determine a helper UE group by measuring the signal transmission power on the downlink with the UE 115. For example, the base station 105-*c* may be configured with a downlink power P and may calculate P1*C*P, where C is the downlink channel from the base station 105-*c* to the UE 115-*g*. Further, C*P may correspond to the received power of downlink data from the base station 105-*c* to UE 115-*g*. The base station 105-*c* may use or determine (e.g. set) a threshold T based on P1*C*P. For example, T may be 5 dB above P1*C*P. When other UEs 115 sidelink transmission power times its received SRS power (e.g., P1*C1*SP1 or P1*C2*SP2) satisfies (e.g., is greater than or equal to) the threshold, then that UE 115 may be a member of the helper UE group that may potentially assist the UE 115-*g* and hence may transmit a measurement report to base station 105-*c* indicating the that threshold T is satisfied. For example, if the UE 115-*i* determines that P1*C2*SP2 is greater than the threshold T, then the base station 105-*c* may determine that the UE 115-*i* may be a member of the helper UE group that may assist the UE 115-*g* via sidelink communications. If a UE 115 determines that P1*C2*SP2 does not satisfy the threshold, the UE 115 may not be a member of the helper UE group and thus may skip transmitting the measurement report.

In some cases, the base station 105-*c* may transmit the control message via radio resource control (RRC) messaging to the UEs 115-*i* and the UE 115-*h*. In some cases, the RRC message may also indicate the reporting resources corresponding to the control message, and the UEs 115 may report various sidelink diversity information and UE state information with the identified resources. The base station 105-*c* may indicate to a UE 115 (e.g., the UE 115-*i*) it is a member of the determined helper UE group and may assist UE 115-*g*.

Figure 4:
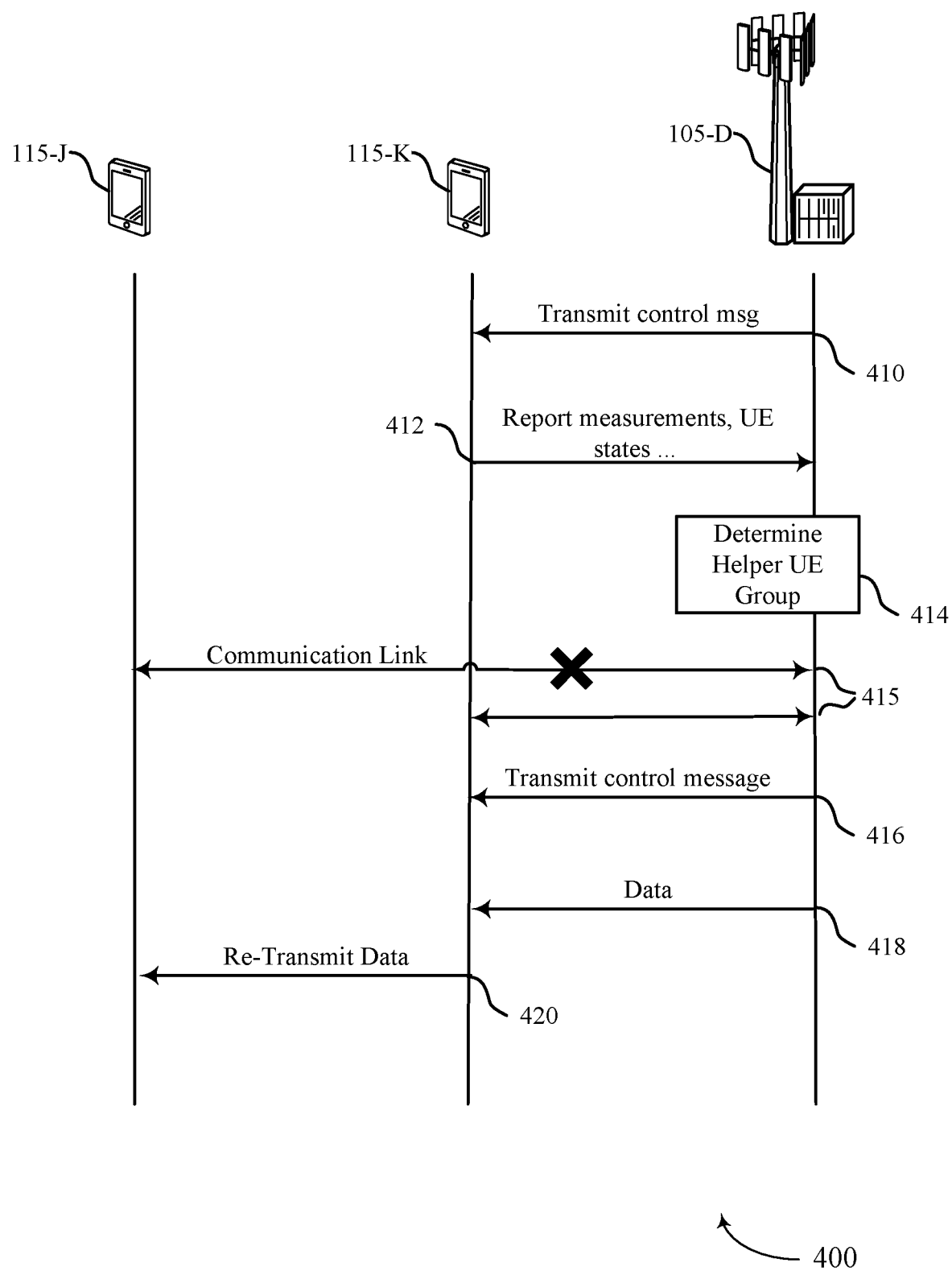
FIG. 4 illustrates an example of a process flow diagram in accordance with aspects of the present disclosure.

FIG. 4 illustrates an example of a process flow diagram 400 in accordance with aspects of the present disclosure. In some examples, process flow diagram 400 may implement aspects of wireless communications system 100. Process flow diagram 400 includes UE 115-*j*, UE 115-*k*, and base station 105-d, which may be examples of the corresponding devices of FIGS. 1 through 4. The base station may establish a communication link with the UE 115-j and UE 115-k.

At 405, the base station 105-d detects that the communication link between the base station 105-d and the UE 115-j is dropped or is degraded below a predetermined point. This may be due to blocking, fading or other reasons. Accordingly, the base station 105-d determines to communicate with the UE 115-j using a sidelink channel between another UE 115-k and the UE 115-j.

At 410, the UE 115-k receives, from the base station 105-d, a control message that indicates at least a request for sidelink diversity information and UE state information. The request for the sidelink diversity information may include a request for measurement of sidelink channel. In some cases, the control message includes a measurement resource of the sidelink channel. In one example aspect, the control message may be transmitted using a radio resource control (RRC) message. The base station 105-d may transmit such a control message to a plurality of UEs 115 nearby the UE 115-j, such as the UE 115-k.

At 412, the nearby UEs such as the UE 115-k transmits a report, in response to the request sent at 410, sidelink diversity information, and UE state information, among others. Based on the control message received at 410, the UE 115-k may report the requested information as scheduled or on demand.

At 414, the base station 105-d, upon gathering related information from nearby UEs such as the UE 115-k, may determines a helper UE group for communications with the UE 115-j. As mentioned above, the related information may include the sidelink channel diversity information and the UE state information of each nearby potential helper UE. In one example aspect, the base station 105-d may determine that the UE 115-k is in the helper UE group to facilitate communications between the base station 105-d and the UE 115-j, based on the report transmitted by the UE 115-j to the base station 105-d.

At 415, the base station 105-d detects that the communication link between the base station 105-d and the UE 115-j is dropped or is degraded below a predetermined point. This may be due to blocking, fading or other reasons. At 415, the base station also determines that the link between the base station 105-d and the UE 115-k is working as expected. Accordingly, the base station 105-d determines to communicate with the UE 115-j using the link between the base station 105-d and the UE 115-k and the sidelink channel between another UE 115-k and the UE 115-j.

In an alternative embodiment, the base station 105-d may detect the failure of the communication link between the base station 105-d and the UE 115-j, prior to sending the control message at 410. In other words, the base station 105-d may initiate a request for a report of the UE sidelink diversity information, UE state information, etc., and may determine a helper UE group, only upon detecting a failure of the direct downlink to the target UE 115-j.

At 416, the base station 105-d may transmit another control message to the nearby UEs such as the UE 115-k to indicate that the UE 115-k is in the determined helper UE group. The control message may also include other information such as downlink data transmission schedule and resource allocations for the data transmissions intended for the target UE 115-j.

At 418, the base station 105-d transits data to the helper UE 115-k that is intended for the target UE 115-j, based on the downlink transmission schedule that was transmitted to the helper UE 115-k at 416. In one example aspect, the base station 105-d may transmit the data in a multi-cast fashion, to multiple UEs 115, including both the helper UE 115-k and the target UE 115-j, in case the downlink data transmission happens to go through to the target UE 115-j this time.

At 420, the helper UE 115-k retransmits the data received from the base station 105-d at 418 to the target UE 115-j, using a sidelink channel, provided that the downlink data transmission from the base station 105-d to the target UE 115-j did not go through. In one example aspect, the helper UE 115-k simply relays the data to the target UE without any processing or decoding. In another example aspect, the helper UE 115-k may at least partially decode the data transmission received from the base station 105-d before retransmitting the data to the target UE 115-j. In some example aspect, the data is retransmitted to the UE 115-j in accordance with a grant received from the base station 105-d, and the grant may schedule transmission of the data transmission via the sidelink channel.

Figure 5:
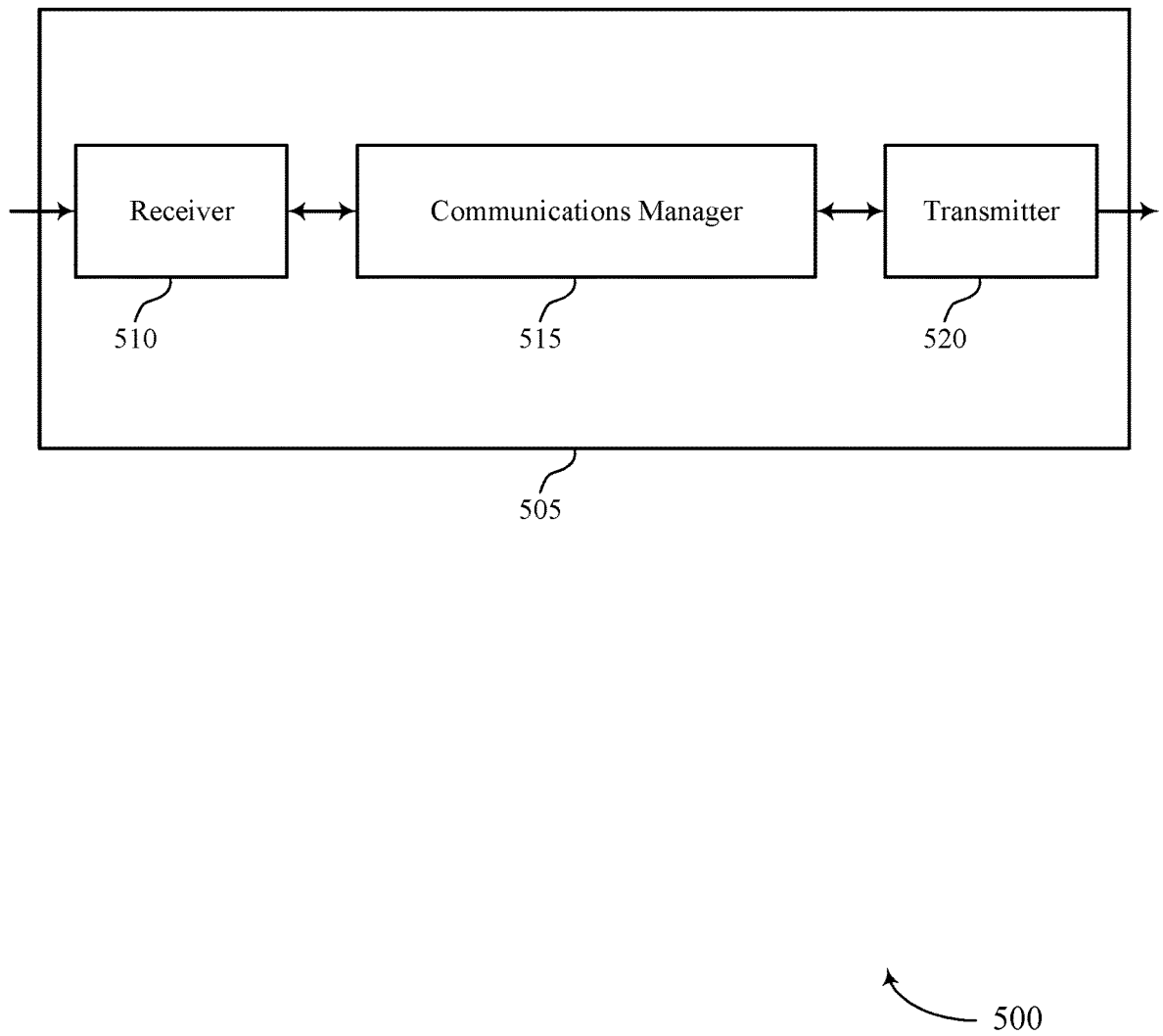
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink channel measurement and diversity, UE state information, etc.). Information may be passed on to other components of the device 505. The receiver 510 may be an example of aspects of the transceiver 820 described with reference to FIG. 8. The receiver 510 may utilize a single antenna or a set of antennas or multiple antenna panels.

The communications manager 515 may receive, from a base station, a control message that indicates a request for sidelink measurements, sidelink diversity information, and UE station information, among others and may transmit various reports, including a measurement report to the base station based on the received request. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 (e.g., a UE 115) to more efficiently coordinate communication between a base station 105 and a second UE 115, and more specifically to determine sidelink channel state information and UE state information. For example, the device 505 may receive a control message from the base station, where the control message indicates a request for sidelink measurements, sidelink diversity information, and UE station information, among others.

Based on implementing the sidelink measurement techniques as described herein, a processor of a UE 115 (e.g., controlling the receiver 510, the transmitter 520, or the transceiver 820 as described with reference to FIG. 8) may increase reliability and decrease signaling overhead in sidelink communication because the base station may determine whether the UE is in a helper UE group and whether to utilize the sidelink based at least in part on the membership in the helper UE group.

Figure 6:
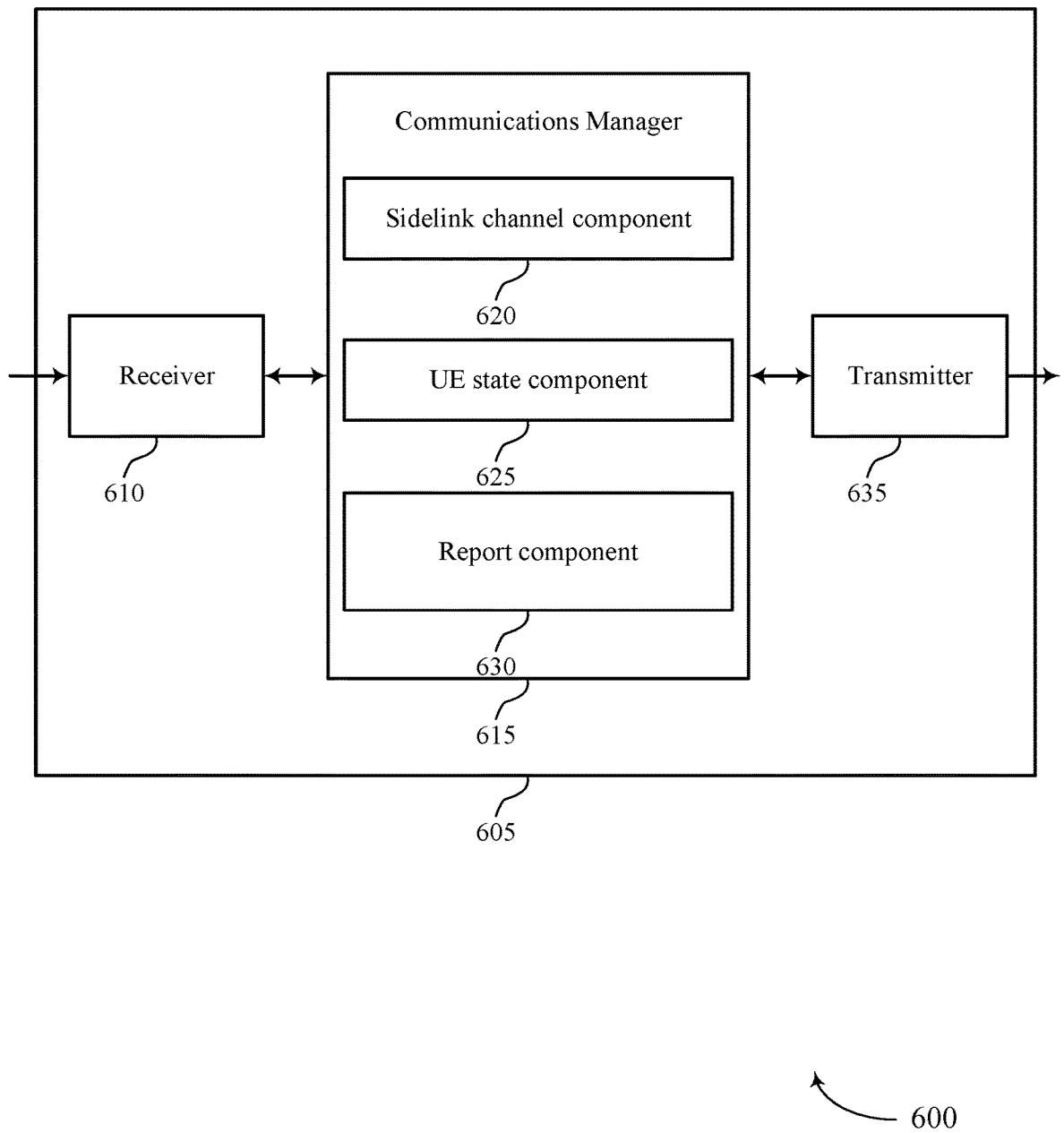

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to sounding reference signal channel measurement for sidelink communication, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink channel component 620, a UE state component 625, and a report component 630. The communications manager 615 may be an example of aspects of the communications manager 810 described herein.

The sidelink channel component 620 may determine and generate sidelink channel diversity information for the UE. The UE state component 625 may determine and generate the UE state information and UE traffic pattern information. The report component 630 may transmit a report of the sidelink channel diversity information, the UE state information, the UE traffic pattern information, and sidelink measurement information to the base station.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
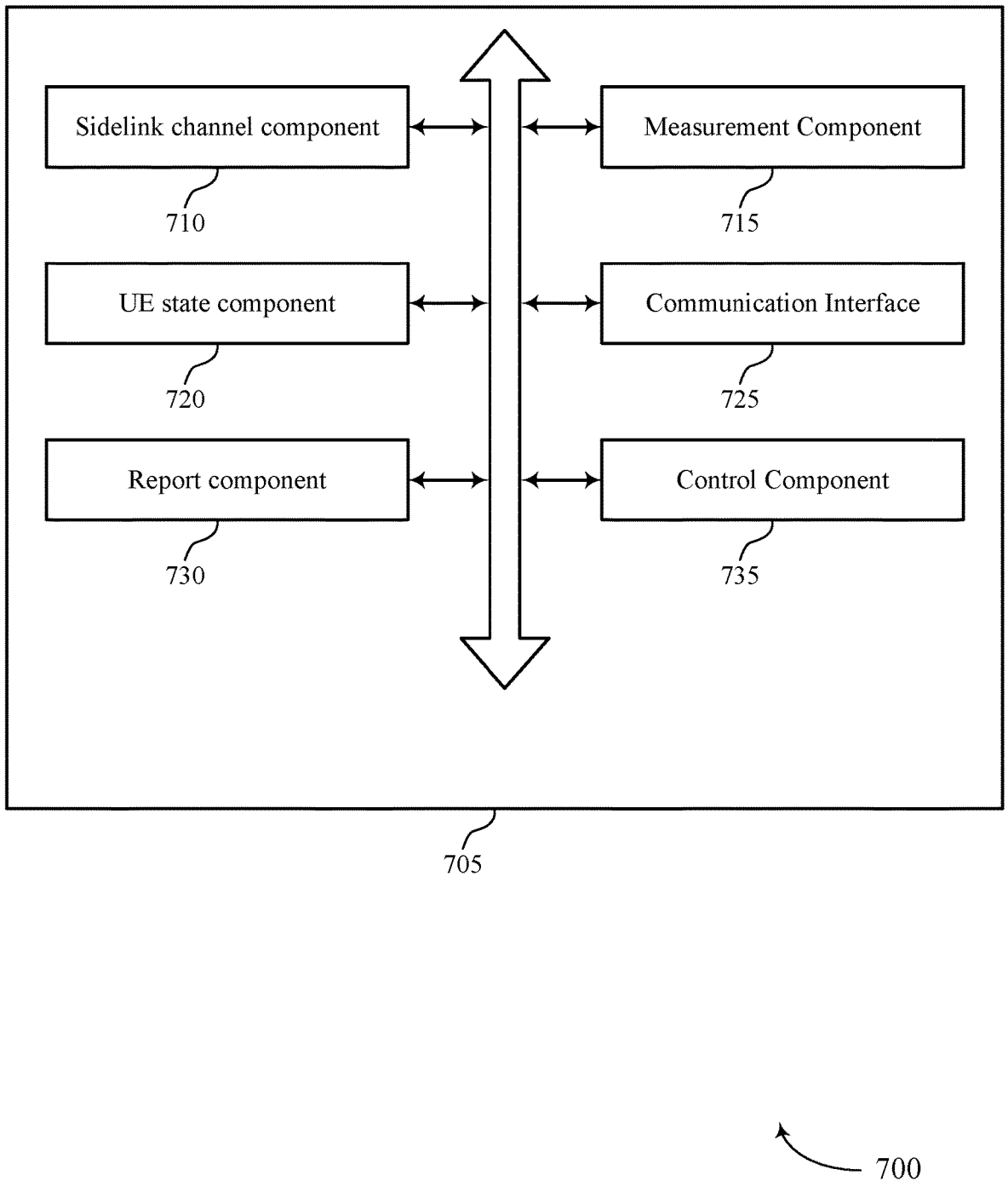
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a sidelink channel component 710, a measurement component 715, a UE state component 720, a communication interface 725, a report component 730, a control component 735, and a RRC component 740. Each of these modules may communicate, directly or indirectly, with one another (e.g., via one or more buses).

The sidelink channel component 710 may determine and generate channel diversity information for a sidelink channel related to a target UE. The sidelink channel component 710 may also transmit the data transmission to a target UE via the sidelink channel. The measurement component 715 may measure the sidelink channel quality using some reference signal such as sounding reference signals.

The UE state component 720 may determine and generate UE state information including UE traffic pattern information. The communication interface 725 may receive a data transmission from the base station based on the transmitting the measurement report and reports of UE state information and sidelink channel diversity information. In some examples, the communication interface 725 may receive a grant scheduling transmission of the data transmission via the sidelink channel, where the data transmission is transmitted to the second UE or target UE via the sidelink channel based on the grant. The report component 730 may report the measurement report, sidelink channel diversity information, and UE state information to the base station.

The control component 735 may receive the control message including a measurement resource of the sidelink channel, where the reference signal measurement is generated based on measuring the measurement resource of the sidelink channel.

In some examples, the control component 735 may receive the control message that indicates whether the report of sidelink channel diversity information, the UE state information, UE traffic pattern information is scheduled or on demand. In some examples, the control component 735 may receive the control message that indicates the resource allocation for data transmission on a sidelink channel.

Figure 8:
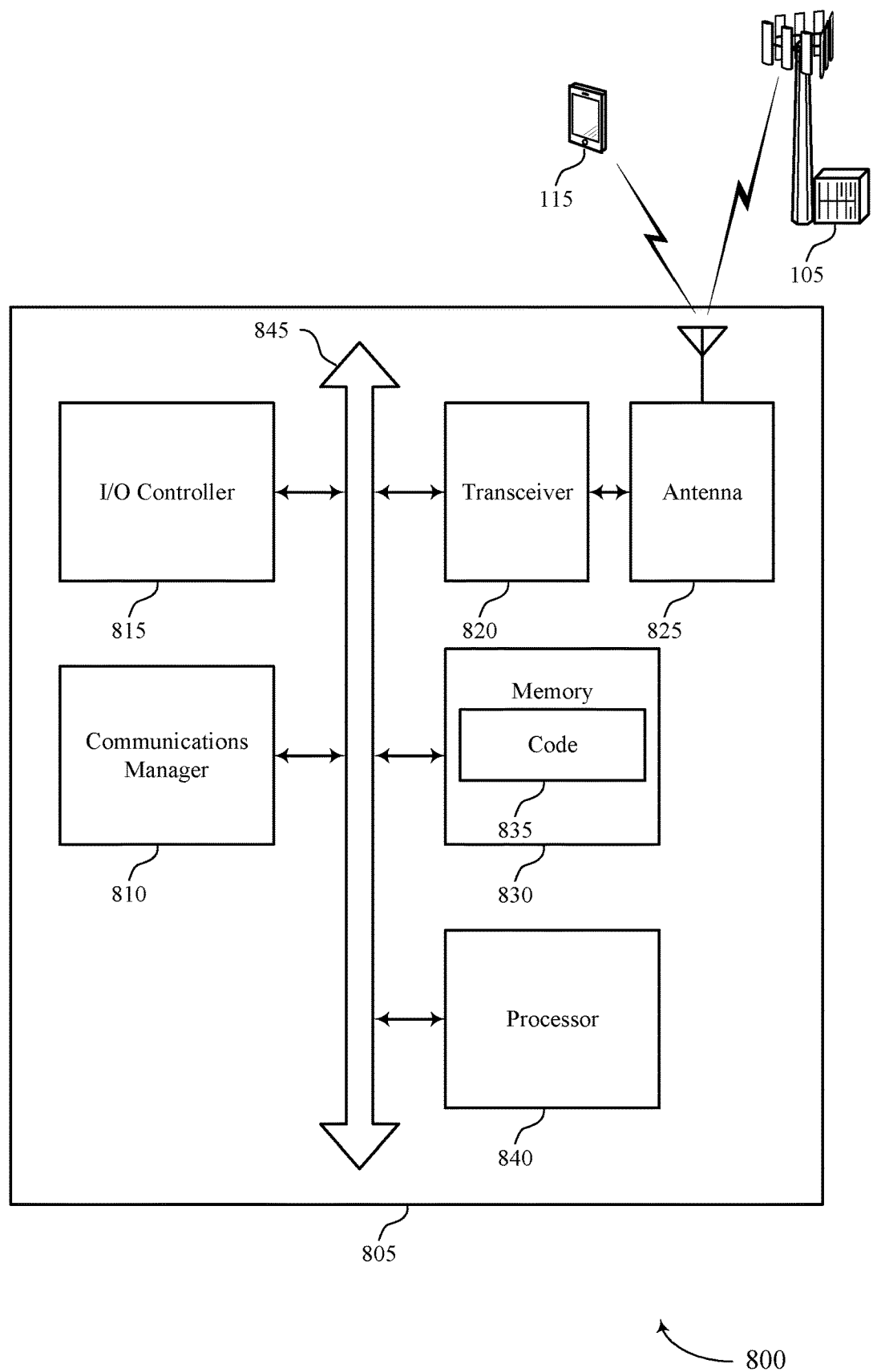
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a control message that indicates whether the report of sidelink channel diversity information and UE state information is scheduled or on demand and a resource allocation for the report. The communication manager 810 may determine and generate the sidelink channel diversity information and UE state information and transmit the report to the base station. The communication manager 810 may also generate a reference signal measurement of a reference signal transmitted by a second UE via a sidelink channel between the UE and the second UE, and transmit a measurement report to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting determining UE sidelink diversity information and UE state information to facilitate communications with another UE via a sidelink channel).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
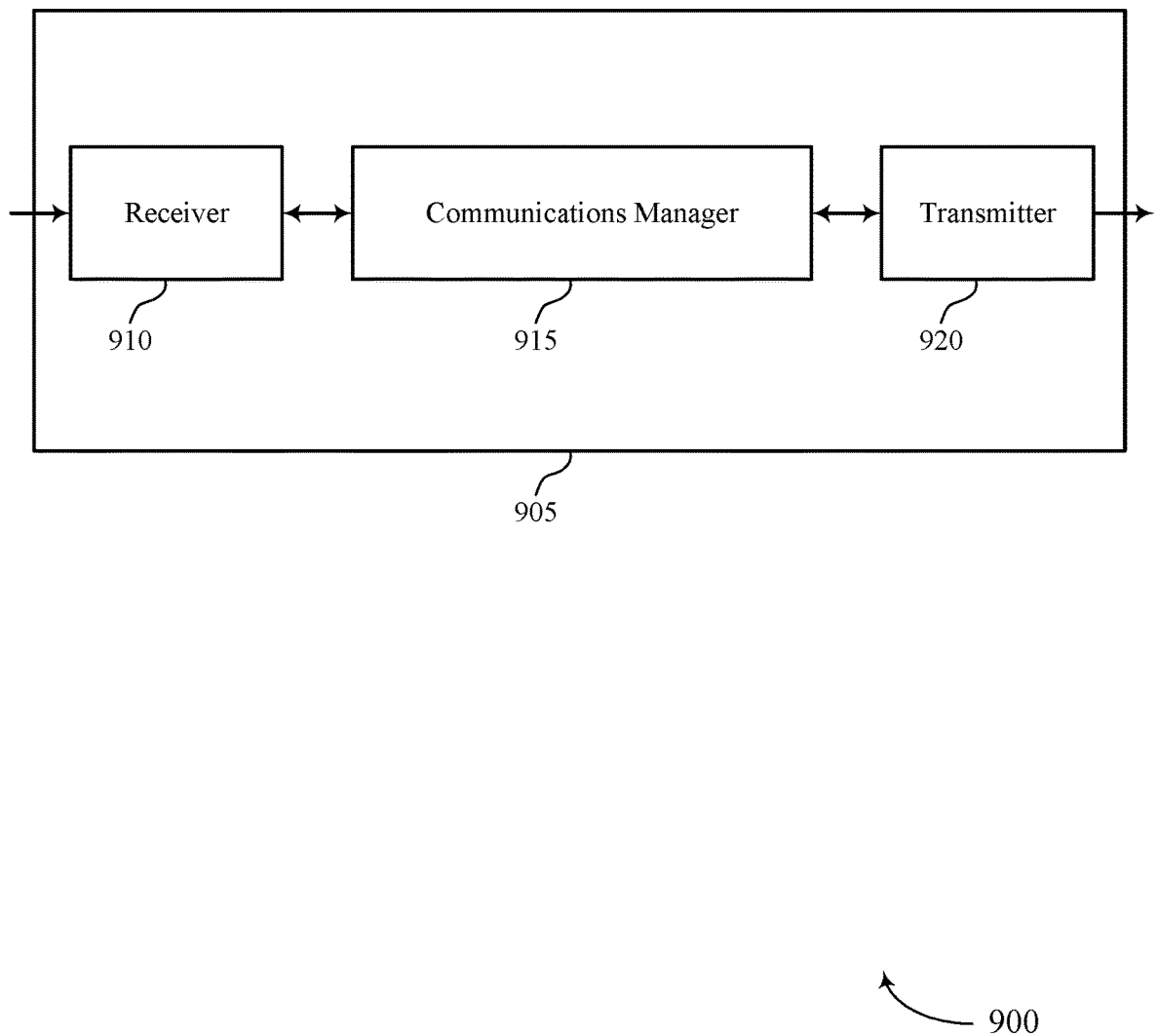
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to sounding reference signal channel measurement for sidelink communication, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to one or more helper UEs, a control message that indicates a request for a report of sidelink channel diversity information, UE state information and the report of measurements of sidelink between the first UE and the second UE. The communications manager 915 may receive the requested reports. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
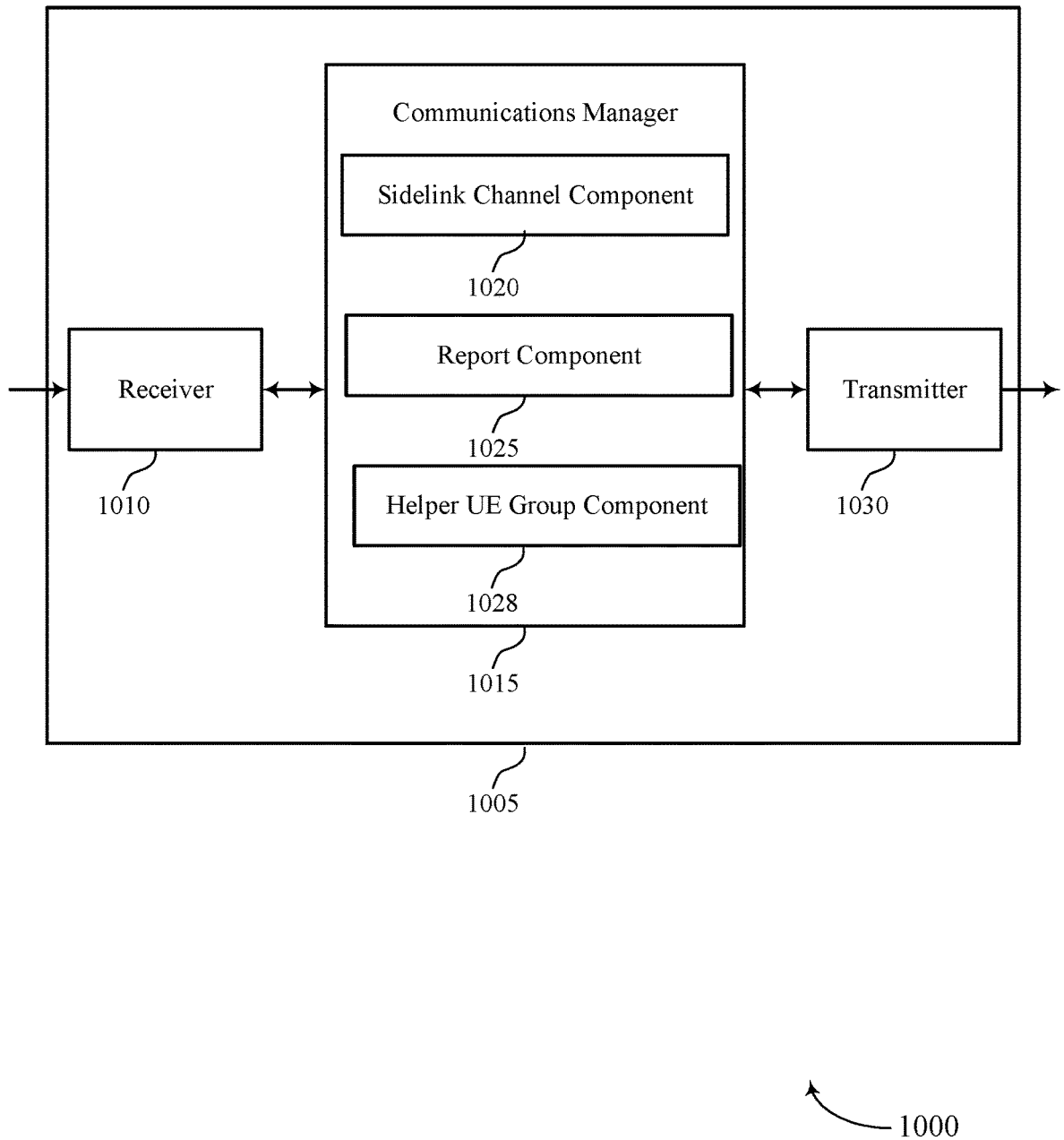

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to sounding reference signal channel measurement for sidelink communication, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a sidelink channel component 1020, a report component 1025, and a helper UE group component 1028. The communications manager 1015 may be an example of aspects of the communications manager 1210 described herein.

The sidelink channel component 1020 may process various sidelink channel correlation information, sidelink channel diversity information, and sidelink measurements to help the base station to determine a helper UE group.

The report component 1025 may process reports from potential helper UEs. Each report may include sidelink channel correlation information, sidelink channel diversity information, sidelink measurements, UE state information and UE traffic pattern information, among others. The report component 1025 may combine, filter, and summarize various reports and pass the processed information to other components of the communications manager 1015 such as the helper UE group component 1028.

The helper UE group component 1028 may determine a helper UE group based on received sidelink channel correlation information, sidelink channel diversity information, sidelink measurements, UE state information, and UE traffic pattern information, among others.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
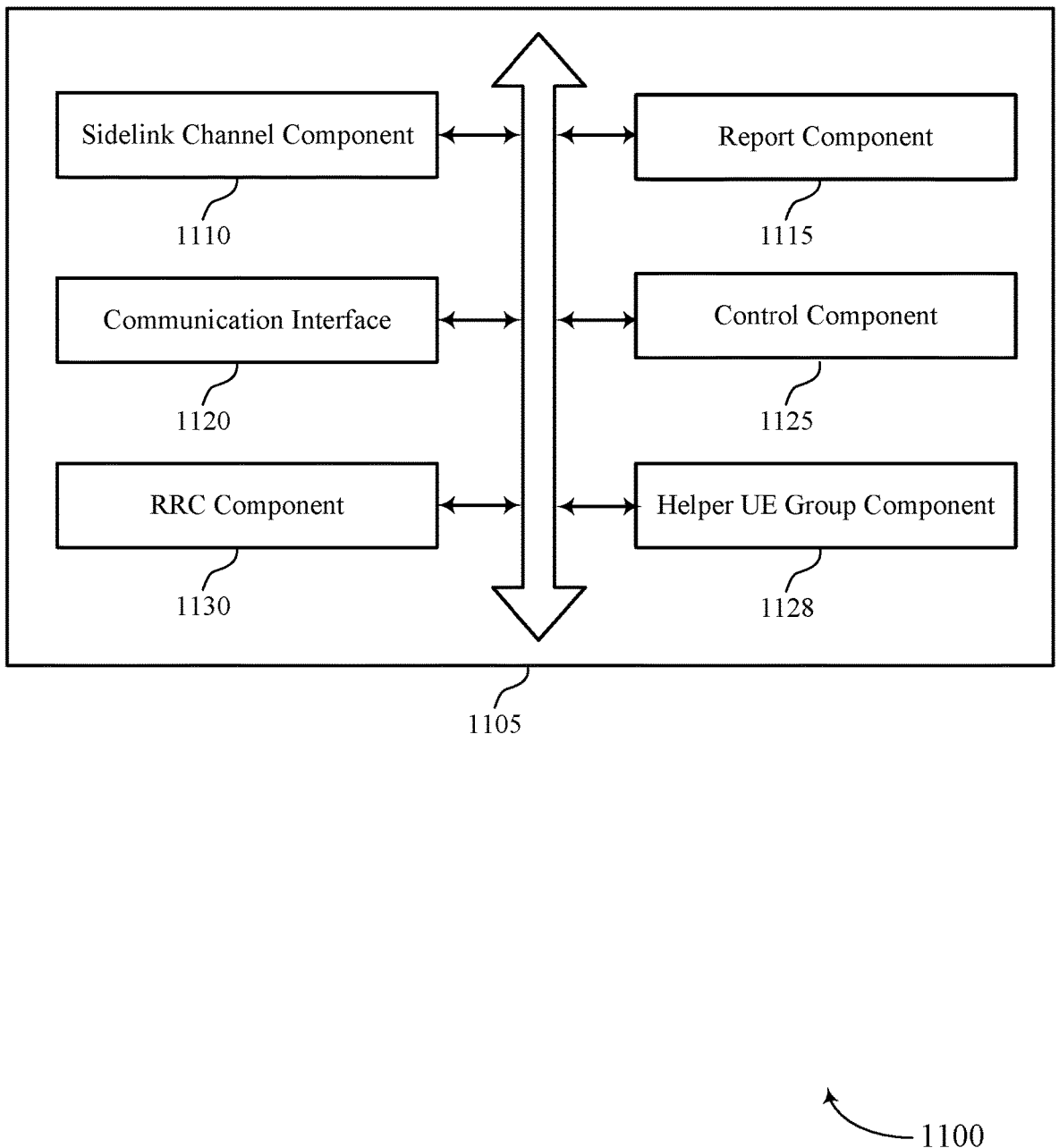
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include a sidelink channel component 1110, a report component 1115, a communication interface 1120, a control component 1125, a helper UE component 1128, and a RRC component 1130. Each of these modules may communicate, directly or indirectly, with one another (e.g., via one or more buses).

The sidelink channel component 1110 may process various sidelink channel correlation information, sidelink channel diversity information, and sidelink measurements to help the base station to determine a helper UE group.

The report component 1115 may process reports from potential helper UEs. Each report may include sidelink channel correlation information, sidelink channel diversity information, sidelink measurements, UE state information and UE traffic pattern information, among others. The report component 1115 may combine, filter, and summarize various reports and sent the processed information to other components of the communications manager 1105 such as the helper UE group component 1128.

The communication interface 1120 may transmit, to a helper UE, a data transmission and a relay instruction that instructs the helper UE to relay the data transmission to the target UE via the sidelink channel based on the receiving the measurement report. In some examples, the communication interface 1120 may transmit, to the helper UE, a grant scheduling transmission of the data transmission via the sidelink channel.

The control component 1125 may transmit the control message including a measurement resource of the sidelink channel. In some examples, the control component 1125 may transmit the control message that indicates a request for reports of various sidelink channel related information (sidelink channel diversity, sidelink channel correlation and sidelink measurements) either on schedule or on demand. In some examples, the control component 1125 may transmit the control message that indicates to each potential helper UE whether it has been selected as a member of the helper UE group.

The helper UE group component 1128 may determine a helper UE group based on received sidelink channel correlation information, sidelink channel diversity information, sidelink measurements, UE state information and UE traffic pattern information, among others, and a report component 1028. The RRC component 1130 may transmit a radio resource control message that indicates the measurement threshold or other control information as indicated.

Figure 12:
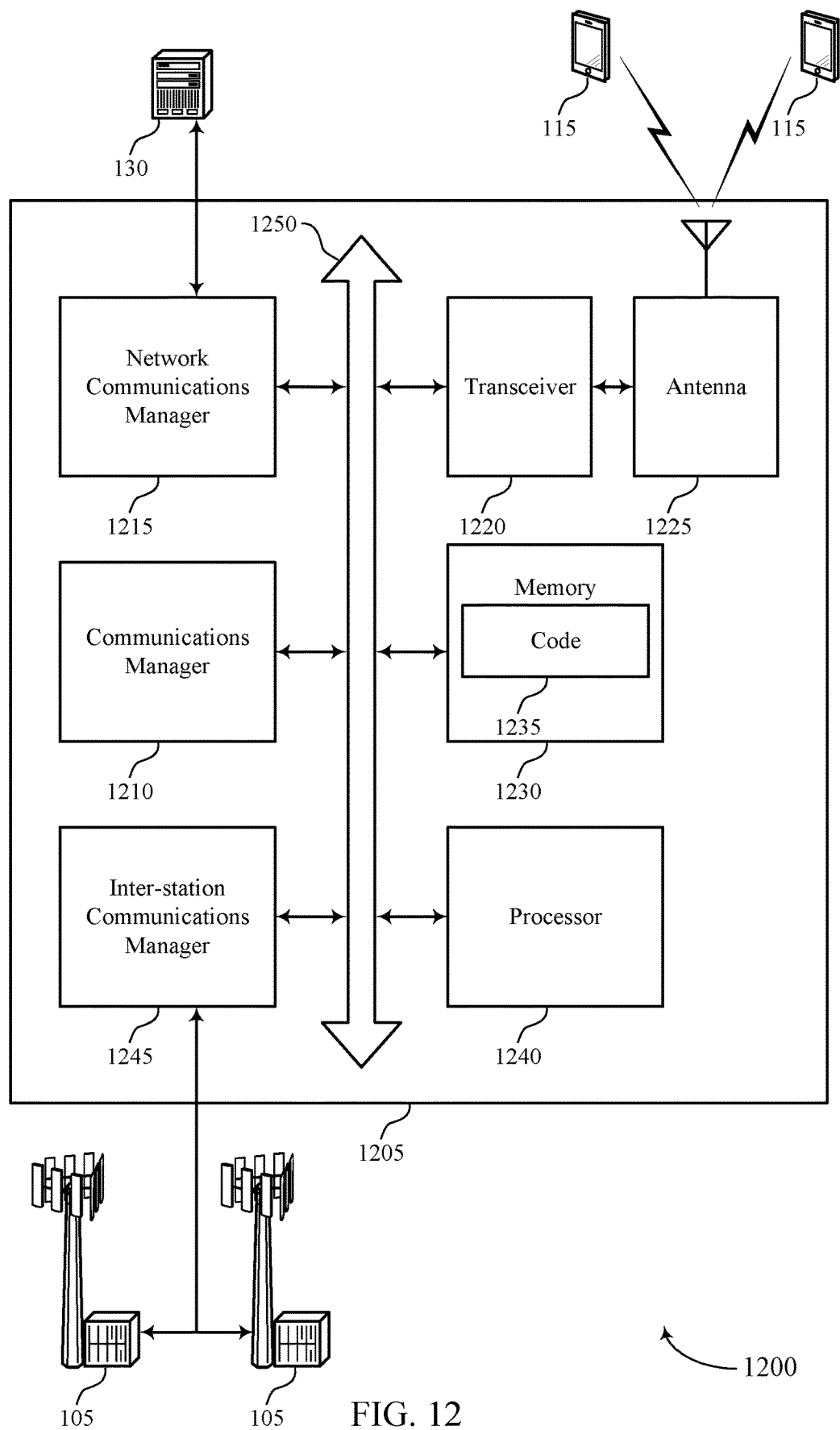
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to one or more potential helper UEs, a control message that indicates a request for information related to sidelink channel and UE state and receive a report of the requested information from a helper UE. The communications manager 1210 may also transmit another control message to the potential helper UE indicating that the UE is selected as the helper UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting sounding reference signal channel measurement for sidelink communication).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
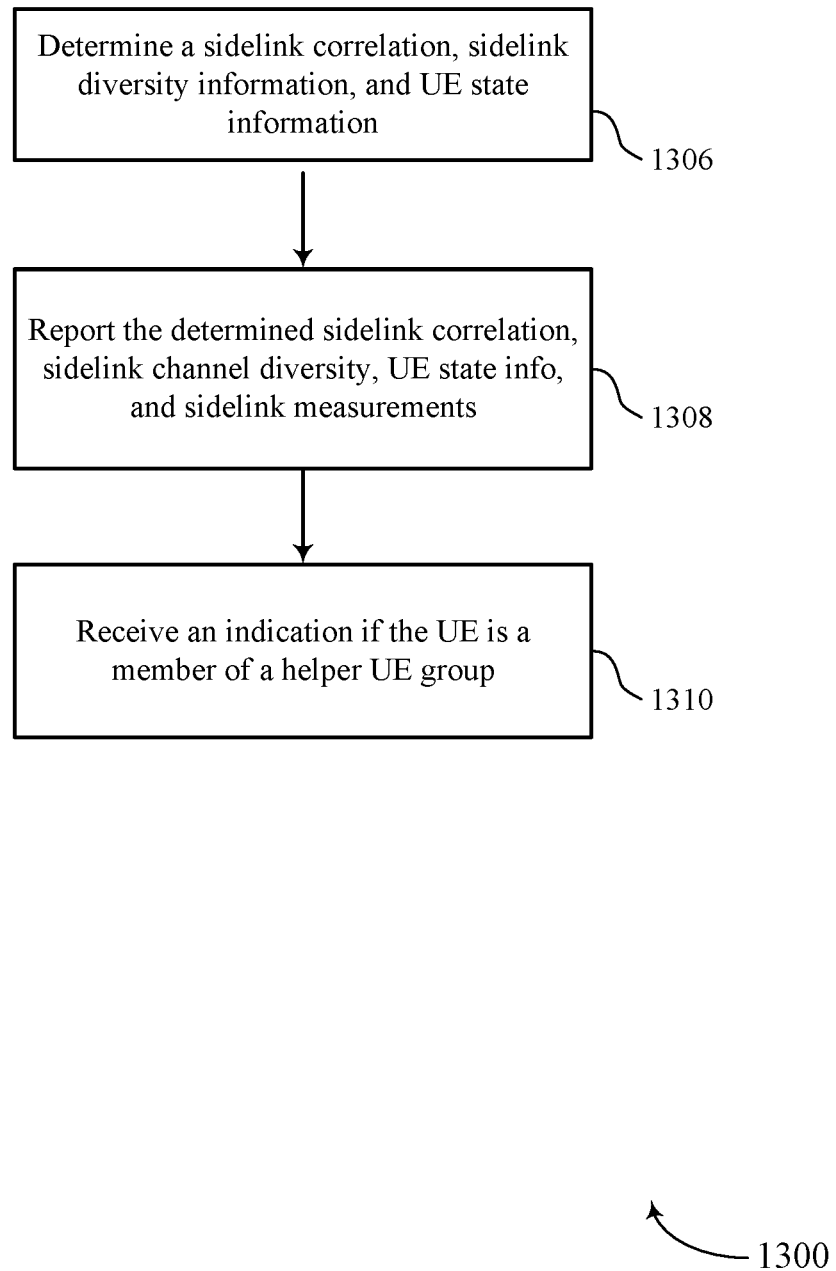
FIGS. 13 through 14 show flowcharts illustrating methods performed by a UE or a like device in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware. In one example aspect, the UE performing the method 1300 is a helper UE.

At 1306, the UE determines a sidelink correlation, sidelink channel diversity information, and UE state information. The operations of 1306 may be performed according to the methods described herein. In some examples, aspects of the operations of 1306 may be performed by a sidelink channel component and a UE state component as described with reference to FIGS. 5 through 8.

At 1306, the UE may determine a sidelink correlation with a target UE, based in part on a current measurement of a sidelink channel between the UE and the target UE. The UE may also infer the sidelink correlation with the target UE based in part on historical sidelink channel measurements. For example, if the current sidelink measurement and historical sidelink measurements between the UE and the target UE are both strong, the sidelink correlation may be inferred as being strong. Similarly, if the current sidelink measurement and historical sidelink measurements between the UE and the target UE are both weak, the sidelink correlation may be inferred as being weak. However, if the current sidelink measurements are strong but the historical sidelink measurements are weak, or vice versa, the sidelink correlation may be determined based on a weight associated with each of the current sidelink measurements and the historical sidelink measurements. In one example aspect, the sidelink correlation may be expressed as a value between 0 and 1.

At 1306, the helper UE may determine the sidelink channel diversity. In one example aspect, the channel diversity information may include an indication of whether the helper UE has a direct link to the base station with a link quality above a predetermined threshold and a sidelink to a targeted UE. The channel diversity information may also include an indication of whether a number of sidelinks between the helper UE and the targeted UE is equal to or above a predefined threshold. The sidelink channel diversity information may also include its geological location information if the helper UE has such information available. For example, the geological location information may include the proximity of the helper UE to the target UE.

At 1306, the UE may determine the UE state information. In one example aspect, the UE state information includes an indication on the following: whether the helper UE is capable to send sidelink traffic, whether the UE has sufficient battery and on-board memory to process and transmit the data traffic for or on behalf of the targeted UE, and whether the UE has enough processing power to process the data traffic of the targeted UE in addition to processing its own downlink/uplink data.

At 1306, the UE may determine UE traffic pattern information. In one example aspect, the UE traffic pattern information may include at least an indication of whether the UE has both uplink and downlink data of its own to process and a periodicity of the uplink and downlink data.

At 1308, the UE reports to the base station the determined sidelink correlation, the sidelink channel diversity information, the UE traffic pattern information and UE state information. The operations of 1308 may be performed according to the methods described herein. In some examples, aspects of the operations of 1308 may be performed by the report component as described with reference to FIGS. 5 through 8.

At 1310, the UE receives an indication that the UE is in the determined helper UE group. The operations of 1310 may be performed according to the methods described herein. In some examples, aspects of the operations of 1310 may be performed by the control component as described with reference to FIGS. 5 through 8.

The method 1300 is for illustration purpose and shows one possible process for a UE or a helper UE to facilitate communications between the base station and a target UE using a sidelink channel. In practice, one or more steps shown in the illustrative flowchart for the method 1300 may be combined with other steps, performed in any suitable order, performed in parallel (e.g., simultaneously or substantially simultaneously), or removed.

Figure 14:
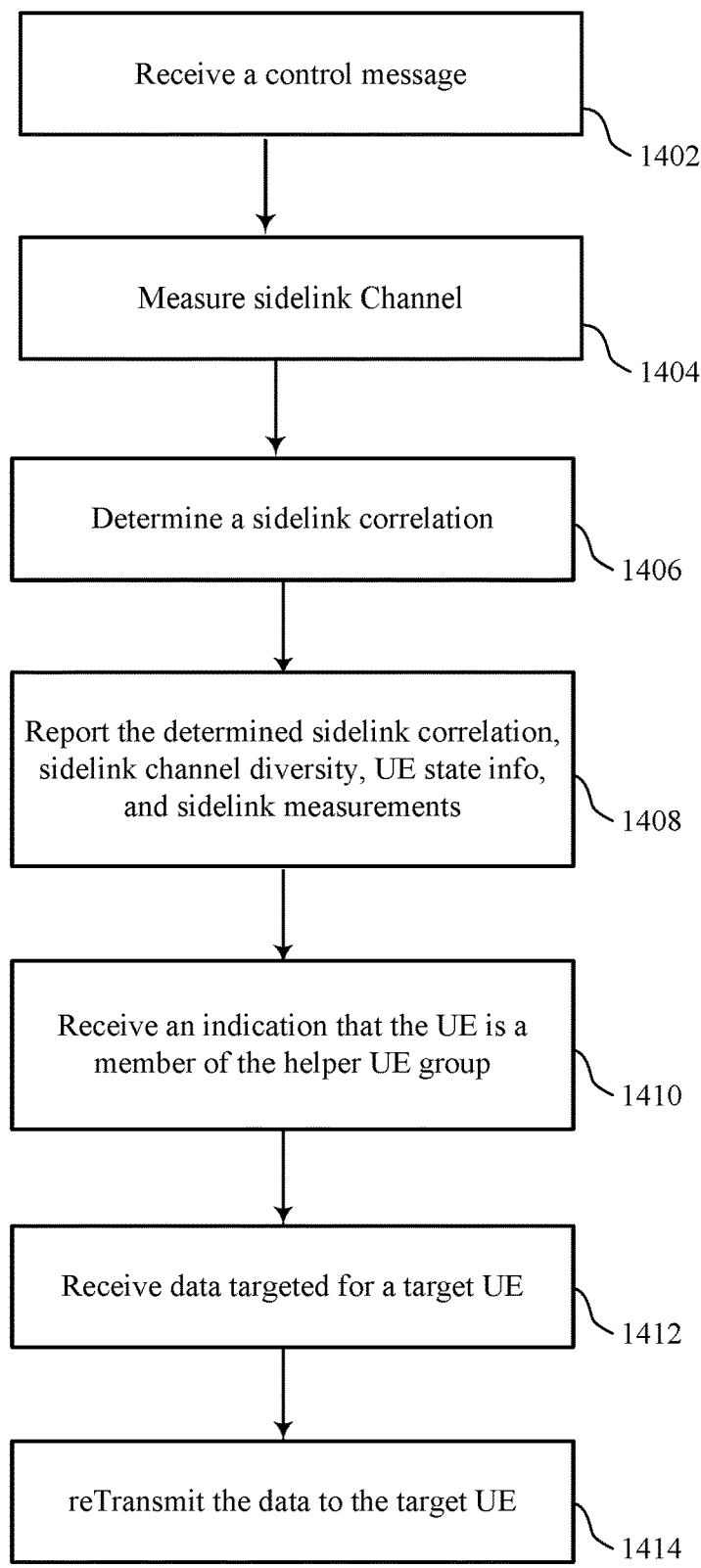

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware. In one example aspect, the UE performing the method 1400 is a helper UE.

At 1402, the UE receive a control message from a base station such as the base station 105 of FIG. 1. The control message may include a request for the UE to measure sidelink link to a target UE, and to report the measurements, sidelink diversity information, sidelink correlation, UE state information, and UE traffic pattern, among other information. The control message may have an indication whether the requested report is scheduled or on demand. If the report is a scheduled one, the control message may include a reporting schedule and a reporting resource allocation. Also included in the control message may be a target UE. The operations of 1402 may be performed according to the methods described herein. In some examples, aspects of the operations of 1402 may be performed by a control component as described with reference to FIGS. 5 through 8.

At 1404, the UE measures one or more sidelinks to the target UE that is identified in the control message. The measurement may take place according to a schedule or on demand, depending on the control message from the base station. The operations of 1404 may be performed according to the methods described herein. In some examples, aspects of the operations of 1404 may be performed by a measurement component as described with reference to FIGS. 5 through 8.

At 1406, the UE determines a sidelink correlation, sidelink channel diversity information, UE state information and UE traffic pattern information. The operations of 1406 may be performed according to the methods described herein. In some examples, aspects of the operations of 1406 may be performed by a sidelink channel component and UE state component as described with reference to FIGS. 5 through 8.

At 1406, the UE may determine a sidelink correlation as related to a target UE, based in part on a current measurement of a sidelink channel between the helper UE and the target UE. The UE may also infer the sidelink correlation with the target UE based in part on historical sidelink channel measurements. For example, if the current sidelink measurements and historical sidelink measurements between the UE and the target UE are both strong, the sidelink correlation may be inferred as being strong. Similarly, if the current sidelink measurements and historical sidelink measurements between the UE and the target UE are both weak, the sidelink correlation may be inferred as being weak. However, if the current sidelink measurement is strong but the historical sidelink measurements are weak, or vice versa, the sidelink correlation may be determined based on a weight associated with each of the current sidelink measurement and the historical sidelink measurements. In one example aspect, the sidelink correlation may be expressed as a value between 0 and 1.

At 1406, the helper UE may determine the sidelink channel diversity. In one example aspect, the channel diversity information may include an indication of whether the helper UE has a direct link to the base station with a link quality above a predetermined threshold and a sidelink to a targeted UE when the direct link. The channel diversity information may also include an indication of whether a number of sidelinks between the helper UE and the targeted UE is equal to or above a predefined threshold. The sidelink channel diversity information may also include its geological location information if the helper UE has such information available. For example, the geological location information may include the proximity of the helper UE to the target UE.

At 1406, the UE may determine the UE state information. In one example aspect, the UE state information includes an indication on the following: whether the helper UE is capable to send sidelink traffic, whether the UE has sufficient battery and on-board memory to process and transmit the data traffic for or on behalf of the targeted UE, and whether the UE has enough processing power to process the data traffic of the targeted UE.

At 1406, the UE may determine UE traffic pattern information. In one example aspect, the UE traffic pattern information include at least an indication of whether the UE has both uplink and downlink data of its own to process and a periodicity of the uplink and downlink data.

At 1408, the UE transmit a report to the base station. The report may include the determined sidelink correlation, the sidelink channel diversity information, the UE traffic pattern information and UE state information. The operations of 1408 may be performed according to the methods described herein. In some examples, aspects of the operations of 1408 may be performed by the report component as described with reference to FIGS. 5 through 8.

At 1410, the UE receives an indication from the base station that the UE is a member of a helper UE group in response to transmitting the report to the base station. The operations of 1410 may be performed according to the methods described herein. In some examples, aspects of the operations of 1410 may be performed by the control component as described with reference to FIGS. 5 through 8.

At 1412, the UE may receive a data transmission from the base station based in part on the report sent to the base station. The operations of 1412 may be performed according to the methods described herein. In some examples, aspects of the operations of 1412 may be performed by a communication interface as described with reference to FIGS. 5 through 8.

At 1414, the UE may transmit the data transmission to the target UE via the sidelink channel. The operations of 1414 may be performed according to the methods described herein. In some examples, aspects of the operations of 1414 may be performed by a sidelink channel component as described with reference to FIGS. 5 through 8.

The method 1400 is for illustration purpose and shows one possible process for a UE or a helper UE to facilitate communications between the base station and a target UE using a sidelink channel. In practice, one or more steps shown in the illustrative flowchart for the method 1300 may be combined with other steps, performed in any suitable order, performed in parallel (e.g., simultaneously or substantially simultaneously), or removed.

Figure 15:
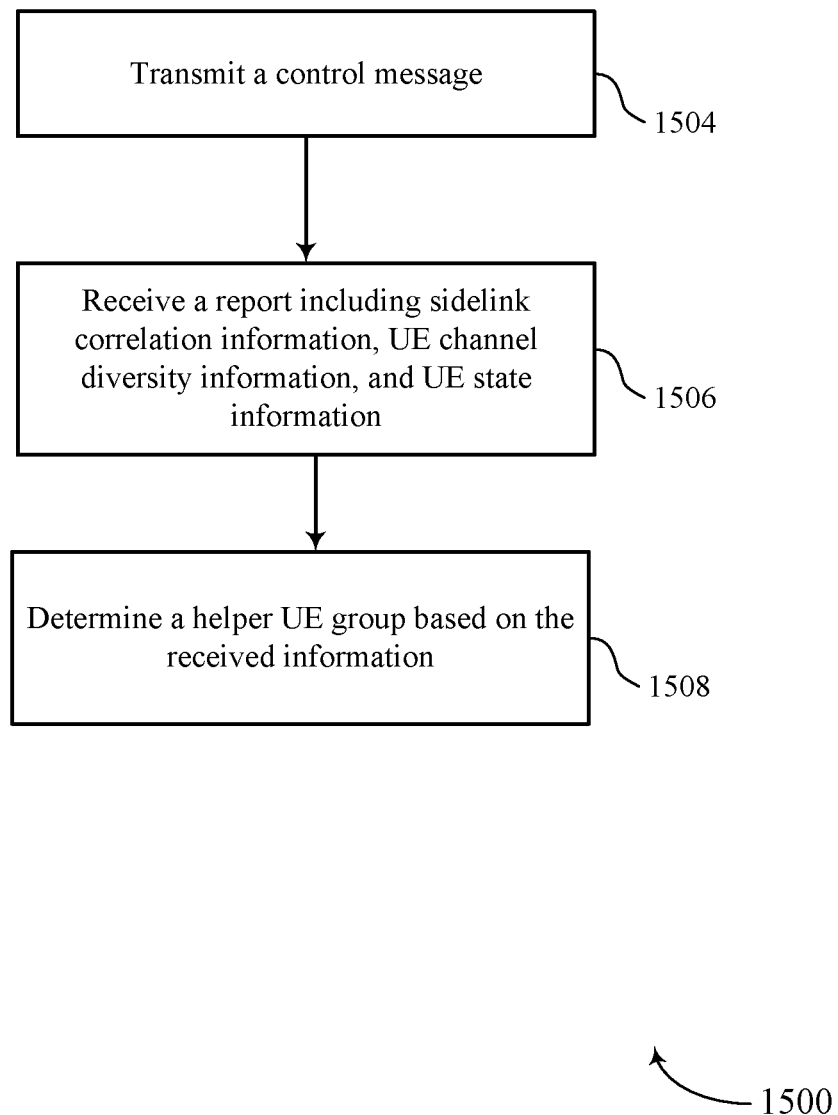
FIGS. 15 through 16 show flowcharts illustrating methods performed by a base station or a like device in accordance with aspects of the present disclosure.

FIG. 15 shows a flowchart illustrating a method 1500 in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1504, the base station may transmit, to a group of potential helper UEs, a control message that includes at least a request for a report of information related to the UE sidelink, UE state, UE traffic pattern, and an indication of whether the report is scheduled or on demand. The control message may also include a report resource allocation and an identification of a target UE. In one example aspect, the base station transmits the control message upon detecting a failure of the direct downlink channel to the target UE due to signal fading or blockage. The operations of 1504 may be performed according to the methods described herein. In some examples, aspects of the operations of 1504 may be performed by a control component, and a communication interface as described with reference to FIGS. 9 through 12.

At 1506, the base station receives a report from each of the potential helper UEs and the report may include sidelink correlation information, sidelink diversity information, UE state information, UE traffic pattern, and sidelink measurements, as related to helper UE and the target UE. The operations of 1506 may be performed according to the methods described herein. In some examples, aspects of the operations of 1506 may be performed by a report component and a sidelink channel component as described with reference to FIGS. 9 through 12.

At 1508, the base station may determine a helper UE group to facilitate the communications with the target UE since the direct downlink channel to the target UE is either broken or degraded beyond a predetermined threshold. The operations of 1508 may be performed according to the methods described herein. In some examples, aspects of the operations of 1508 may be performed by a helper UE group component and a sidelink channel component as described with reference to FIGS. 9 through 12.

At 1508, the base station may determine the helper UE group based on the received sidelink correlation information, the sidelink channel diversity information, the UE state information, the UE traffic pattern information, and the sidelink measurements.

At 1508, in one example aspect, the base station may determine the helper UE group by selecting a helper UE in part based on the UL traffic and sidelink traffic pattern including a traffic periodicity, a time offset, payload, and a delay budget of the UL and SL traffic so that various constraints are observed and met. The examples of the various constraints may include a half duplex constraint, a time/frequency resource constraint, and a helper UE's own traffic constraint. In one example aspect, the base station may select as a helper UE a UE that has less of its own downlink/uplink traffic, sidelink traffic or both, than other UEs in the potential helper UE group, everything else being equal.

At 1508, the base station may select a helper UE based on sidelink correlation as related to a target UE. The sidelink correlation may be based in part on a current measurement of a sidelink channel between the helper UE and the target UE. In one example aspect, the base station may select as a helper UE a UE that has a stronger sidelink correlation and stronger sidelink measurements as related to the target UE, than other UEs in the potential helper UE group, everything else being equal.

At 1508, the base station may determine the helper UE group based on sidelink diversity information. In one example aspect, the sidelink channel diversity information may include an indication of whether the helper UE has a direct link to the base station with a link quality above a predetermined threshold and whether the helper UE has a sidelink to the target UE. The channel diversity information may also include an indication of whether a number of sidelinks between the helper UE and the targeted UE is equal to or above a predefined threshold. The sidelink channel diversity information may also include its geological location information if the helper UE has such information available. Accordingly, the base station may select a UE as a helper UE that has higher sidelink channel diversity than other UEs in the potential helper UE group, everything else being equal.

At 1508, the base station may determine the helper UE group based on the UE state information. In one example aspect, the UE state information may includes an indication of the following: whether the helper UE is capable to send sidelink traffic to target UE, whether the UE has sufficient battery, on-board memory, and processing power to process and transmit the data traffic for the targeted UE. In one example aspect, the UE state information may also include a sidelink buffer status to indicate an amount of data to be carried on sidelinks of the helper UE. In one example aspect, the base station may select as a helper UE a UE that has sufficient battery power, on-board memory and processing capability to handle extra data traffic intended for the target UE, in addition to processing its own data traffic, given everything else being equal. In one example aspect, the base station may select as a helper UE a UE that has less traffic data on its sidelinks than other UEs in the potential helper UE group, everything else being equal.

At 1508, the base station may determine the helper UE group based on the UE traffic pattern information. In one example aspect, the UE traffic pattern information may include at least an indication of whether the helper UE has both uplink and downlink data of its own to process and a periodicity of the uplink and downlink data. Accordingly, the base station may select as a helper UE a UE that has a traffic pattern that indicates less uplink/downlink traffic than the other UEs in the potential helper UE group and that does not conflict or overlap with the target UE's traffic pattern, everything else being equal.

Figure 16:
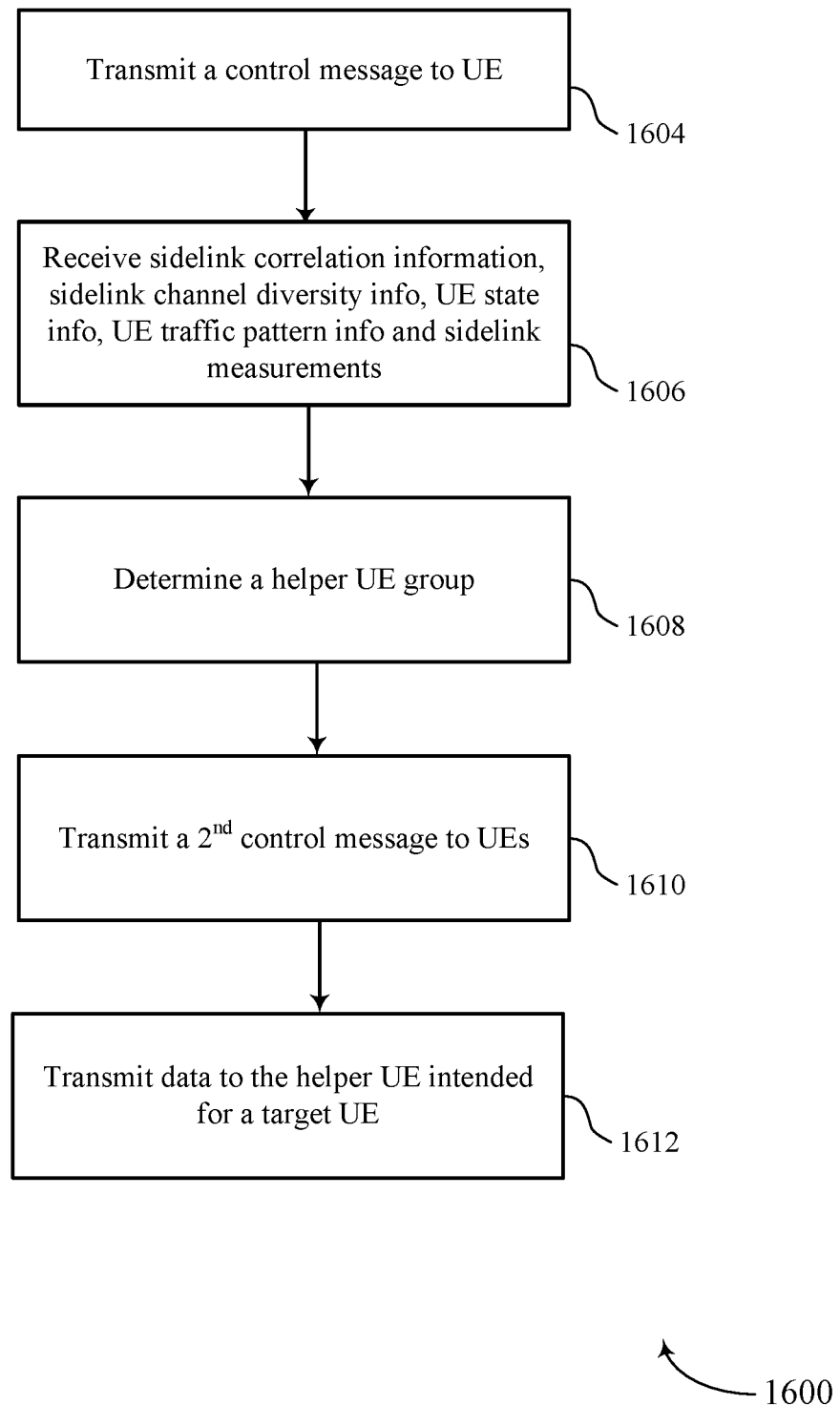

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1604, the base station may transmit, to a group of potential helper UEs, a control message that includes at least a request for a report of information related to the UE sidelink, UE state, UE traffic pattern, and an indication of whether the report is scheduled or on demand. The control message may also include a report resource allocation and an identification of a target UE. In one example aspect, the base station transmits the control message upon detecting a failure of the direct downlink channel to the target UE due to signal fading or blockage. The operations of 1504 may be performed according to the methods described herein. In some examples, aspects of the operations of 1504 may be performed by a control component, and a communication interface as described with reference to FIGS. 9 through 12.

At 1606, the base station receives a report from each of the potential helper UEs and the report may include sidelink correlation information, sidelink diversity information, UE state information, UE traffic pattern, and sidelink measurements, as related to helper UE and the target UE. The operations of 1506 may be performed according to the methods described herein. In some examples, aspects of the operations of 1506 may be performed by a report component and a sidelink channel component as described with reference to FIGS. 9 through 12.

At 1608, the base station may determine a helper UE group to facilitate the communications with the target UE since the direct downlink channel to the target UE is either broken or degraded beyond a predetermined threshold. The operations of 1508 may be performed according to the methods described herein. In some examples, aspects of the operations of 1508 may be performed by a helper UE group component and a sidelink channel component as described with reference to FIGS. 9 through 12.

At 1608, the base station may determine the helper UE group based on the received sidelink correlation information, the sidelink channel diversity information, the UE state information, the UE traffic pattern information, and the sidelink measurements.

At 1608, in one example aspect, the base station may determine the helper UE group by selecting a helper UE in part based on the UL traffic and sidelink traffic pattern including a traffic periodicity, a time offset, payload, and a delay budge of the UL and SL traffic so that various constraints are observed and met. The examples of the various constraints may include a half duplex constraint, a time/frequency resource constraint, and a helper UE's own traffic constraint. In one example aspect, the base station may select as a helper UE a UE that has less of its own downlink/uplink traffic, sidelink traffic or both, than other UEs in the potential helper UE group, everything else being equal.

At 1608, the base station may select a helper UE based on sidelink correlation as related to a target UE. The sidelink correlation may be based in part on a current measurement of a sidelink channel between the helper UE and the target UE. In one example aspect, the base station may select as a helper UE a UE that has a stronger sidelink correlation and stronger sidelink measurements as related to the target UE, than other UEs in the potential helper UE group, everything else being equal.

At 1608, the base station may determine the helper UE group based on sidelink diversity information. In one example aspect, the sidelink channel diversity information may include an indication of whether the helper UE has a direct link to the base station with a link quality above a predetermined threshold and whether the helper UE has a sidelink to the target UE. The channel diversity information may also include an indication of whether a number of sidelinks between the helper UE and the targeted UE is equal to or above a predefined threshold. The sidelink channel diversity information may also include its geological location information if the helper UE has such information available. Accordingly, the base station may select a UE as a helper UE that has higher sidelink channel diversity than other UEs in the potential helper UE group, everything else being equal.

At 1608, the base station may determine the helper UE group based on the UE state information. In one example aspect, the UE state information may includes an indication of the following: whether the helper UE is capable to send sidelink traffic to target UE, whether the UE has sufficient battery, on-board memory, and processing power to process and transmit the data traffic for the targeted UE. In one example aspect, the UE state information may also include a sidelink buffer status to indicate an amount of data to be carried on sidelinks of the helper UE. In one example aspect, the base station may select as a helper UE a UE that has sufficient battery power, on-board memory and processing capability to handle extra data traffic intended for the target UE, in addition to processing its own data traffic, given everything else being equal. In one example aspect, the base station may select as a helper UE a UE that has less traffic data on its sidelinks than other UEs in the potential helper UE group, everything else being equal.

At 1608, the base station may determine the helper UE group based on the UE traffic pattern information. In one example aspect, the UE traffic pattern information may include at least an indication of whether the helper UE has both uplink and downlink data of its own to process and a periodicity of the uplink and downlink data. Accordingly, the base station may select as a helper UE a UE that has a traffic pattern that indicates less uplink/downlink traffic than the other UEs in the potential helper UE group and that does not conflict or overlap with the target UE's traffic pattern, everything else being equal.

At 1610, the base station may transmit another control message to one or more helper UEs. The operations of 1610 may be performed according to the methods described herein. In some examples, aspects of the operations of 1610 may be performed by a control component and a helper UE group component as described with reference to FIGS. 9 through 12.

At 1610, in one example aspect, the base station may send the control message to the members of the helper UE group to notify each helper UE that it is in the helper UE group, so that the helper UE may start monitoring downlink data and control message sent by the base station that are intended for the target UE.

At 1612, the base station may transmit to a helper UE a data transmission and a relay instruction that instructs the helper UE to relay or retransmit the data transmission to the target UE via a sidelink channel. The operations of 1612 may be performed according to the methods described herein. In some examples, aspects of the operations of 1612 may be performed by a communication interface as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications performed by a user equipment (UE), comprising:
   determining a sidelink channel correlation with a target UE;
   transmitting a report to a base station, the report comprising channel diversity information, UE state information, UE traffic pattern information, sidelink channel measurements, and the determined sidelink channel correlation with regard to the UE; and
   receiving an indication from the base station that the UE is a member of a helper UE group for the target UE.

2. The method of claim 1, wherein the channel diversity information comprises an indication of whether the UE has a direct link to the base station with a link quality above a predetermined threshold and a sidelink to the targeted UE when the direct link between the targeted UE and the base station has a link quality below a predetermined threshold and another indication of whether a number of sidelink between the UE and the targeted UE is equal to or above a predefined threshold.

3. The method of claim 1, wherein the UE state information comprises an indication of if the UE is capable to send sidelink traffic, and if the UE has sufficient battery power, on-board memory, and processing power to process data traffic for the targeted UE.

4. The method of claim 3, wherein the UE traffic pattern information comprises at least an indication of if the UE has both uplink and downlink data of its own to process and a periodicity of the uplink and downlink data.

5. The method of claim 1, further comprising measuring one or more sidelink channel between the UE and the target UE.

6. The method of claim 5, wherein the determining of sidelink channel correlation is based on measurements of at least one sidelink channel between the UE and the target UE, a history of sidelink channel measurements, or a combination thereof.

7. The method of claim 1, wherein the transmitting of the report is either scheduled by the base station or triggered by an on-demand request from the base station.

8. The method of claim 1, wherein the UE state information further comprises a sidelink buffer status that is sent to the base station through a medium access control (MAC) signaling message.

9. The method of claim 1, further comprising receiving a control message comprising at least a reporting schedule from the base station for reporting at least one of: the channel diversity information, the UE state information, the UE traffic pattern information, and the sidelink channel measurements.

10. The method of claim 1, further comprising
receiving data from the base station; and
retransmitting the data to the target UE using a sidelink channel.

11. A method for wireless communications performed by a network node, comprising:
transmitting a control message to at least one UE;
receiving a report, from each of the at least one UE, the report comprising sidelink channel correlation, sidelink channel diversity information, and UE state information with regard to the UE, in response to transmitting the control message; and
determining a helper UE group based on the received report for communications with a target UE.

12. The method of claim 11, wherein the received report further comprises UE traffic pattern information and sidelink channel measurements and wherein the network node comprises a base station or a programmable logic control (PLC) node.

13. The method of claim 11, wherein the sidelink channel diversity information comprises an indication of whether the UE has a direct link to the network node with a link quality above a predetermined threshold and a sidelink channel to the targeted UE when the direct link between the targeted UE and the network node has a link quality below a predetermined threshold and another indication of whether a number of sidelink channels between the UE and the targeted UE is equal to or above a predefined threshold.

14. The method of claim 11, wherein the UE state information comprises an indication of whether the UE is capable to send sidelink traffic, if the UE has sufficient battery power, on-board memory, and processing power to process data traffic for the targeted UE.

15. The method of claim 12, wherein the UE traffic pattern information comprises an indication of whether the UE has both uplink and downlink data of its own to process and a periodicity of the uplink and downlink data.

16. The method of claim 11, wherein the sidelink channel correlation is based on measurements of sidelinks between the UE and the target UE, a history of sidelink channel measurements, or a combination thereof.

17. The method of claim 11, wherein the determining of the helper UE group comprises selecting the UE from the at least one UE in part based on uplink traffic and sidelink traffic pattern including a transmission periodicity, a time offset, a payload, and a delay budge of the uplink traffic and sidelink traffic so that at least one of a half duplex constraint, a time/frequency resource constraint, and a helper UE's own traffic constraint is considered and satisfied.

18. The method of claim 11, wherein the determining of the helper UE group further comprises selecting as a helper UE one of the at least one UE that has less downlink traffic, UL traffic and sidelink traffic of its own than other UEs of the at least one UE.

19. The method of claim 11, wherein the receiving of the report is either scheduled by the network node or triggered by an on-demand request from the network node.

20. The method of claim 11, further comprising transmitting data to the UE to be forwarded to the target UE using a sidelink channel.

21. A user equipment (UE) for wireless communications, comprising
a transceiver;
a memory; and
at least one processor coupled to the memory and configured to determine a sidelink channel correlation with a target UE;
transmit a report to a base station, the report comprising channel diversity information, UE state information, UE traffic pattern information, sidelink channel measurements, and the determined sidelink channel correlation with regard to the UE; and
receive an indication from the base station that the UE is a member of a helper UE group for the target UE.

22. The UE of claim 21, wherein the at least one processor is further configured to measure one or more sidelink channel between the UE and the target UE.

23. The UE of claim 21, wherein determining of the sidelink channel correlation is based on measurements of at least one sidelink channel between the UE and the target UE, a history of sidelink channel measurements, or a combination thereof.

24. The UE of claim 21, wherein transmitting the report is either scheduled by the base station or triggered by an on-demand request from the base station.

25. The UE of claim 21, wherein the at least one processor is further configured to receive a control message comprising at least a reporting schedule from the base station for reporting at least one of: the channel diversity information, the UE state information, the UE traffic pattern information, and the sidelink channel measurements.

26. A apparatus for wireless communications performed by a network node, the apparatus comprising:
means for transmitting a control message to at least one UE;
means for receiving a report, from each of the at least one UE, the report comprising sidelink channel correlation, sidelink channel diversity information, and UE state information with regard to the UE, in response to transmitting the control message; and means for determining a helper UE group based on the received report for communications with a target UE.

27. The apparatus of claim 26, wherein the determining of the helper UE group comprises selecting the UE from the at least one UE in part based on uplink traffic and sidelink traffic pattern including a transmission periodicity, a time offset, a payload, and a delay budge of the uplink traffic and sidelink traffic so that at least one of a half duplex constraint, a time/frequency resource constraint, and a helper UE's own traffic constraint is considered and satisfied.

28. The apparatus of claim 26, wherein the means for determining of the helper UE group further comprises means for selecting as a helper UE one of the at least one UE that has less downlink traffic, UL traffic and sidelink traffic of its own than other UEs of the at least one UE.

29. The apparatus of claim 26, wherein receiving of the report is either scheduled by the network node or triggered by an on-demand request from the network node and wherein the network node comprises a base station or a programmable logic control (PLC) node.

30. The apparatus of claim 26, further comprising means for transmitting data to the UE to be forwarded to the target UE using a sidelink channel.

* * * * *